US011308486B2

(12) United States Patent
Wright et al.

(10) Patent No.: US 11,308,486 B2
(45) Date of Patent: Apr. 19, 2022

(54) METHOD AND SYSTEM FOR THE SECURE TRANSFER OF ENTITIES ON A BLOCKCHAIN

(71) Applicant: nChain Holdings Limited, St. John's (AG)

(72) Inventors: Craig Steven Wright, London (GB); Stephane Savanah, London (GB)

(73) Assignee: nChain Holdings Limited, St. John's (AG)

( * ) Notice: Subject to any disclaimer, the term of this patent is extended or adjusted under 35 U.S.C. 154(b) by 596 days.

(21) Appl. No.: 16/077,999

(22) PCT Filed: Feb. 16, 2017

(86) PCT No.: PCT/IB2017/050861
§ 371 (c)(1),
(2) Date: Aug. 14, 2018

(87) PCT Pub. No.: WO2017/145018
PCT Pub. Date: Aug. 31, 2017

(65) Prior Publication Data
US 2021/0233071 A1    Jul. 29, 2021

(30) Foreign Application Priority Data

Feb. 23, 2016  (GB) ..................................... 1603123
Feb. 23, 2016  (GB) ..................................... 1603125
Apr. 22, 2016  (GB) ..................................... 1607063

(51) Int. Cl.
*G06Q 20/00*      (2012.01)
*G06Q 20/38*      (2012.01)
(Continued)

(52) U.S. Cl.
CPC ..... *G06Q 20/3829* (2013.01); *G06F 16/2255* (2019.01); *G06F 16/2365* (2019.01);
(Continued)

(58) Field of Classification Search
CPC ........... G06Q 20/3829; G06Q 20/3825; G06Q 20/223; G06Q 20/3827; G06Q 20/0655;
(Continued)

(56) References Cited

U.S. PATENT DOCUMENTS 5,600,725 A    2/1997  Rueppel et al.
5,761,305 A    6/1998  Vanstone et al.
(Continued)

FOREIGN PATENT DOCUMENTS

AU    2016100059 A4    3/2016
CA      2867765 A1    4/2016
(Continued)

OTHER PUBLICATIONS

Goldfeder et al., "Securing Bitcoin wallets via threshold signatures" Princeton's Center for Information Technology Policy, Mar. 28, 2014, 11 pages.
(Continued)

*Primary Examiner* — Dante Ravetti
(74) *Attorney, Agent, or Firm* — Davis Wright Tremaine LLP

(57) ABSTRACT

The invention provides a secure method for exchanging entities via a blockchain. The invention incorporates tokenisation techniques, and also techniques for embedding metadata in a redeem script of a blockchain transaction. Embodiment(s) provide a method of: generating a first script, the first script comprising: a first set of metadata associated with a first invitation for the exchange of a first entity by a first user, the first set of metadata comprising an indication of the first entity to be offered for exchange and a first location condition for the exchange, a first user public key (P1A) associated with the first user, wherein the first user public key (P1A) is part of an asymmetric cryptographic pair comprising the first user public key (P1A) and a first user
(Continued)

private key (V1A). The script may further comprise a first third-party public key (P1T) associated with a first third-party, wherein the first third-party public key (P1T) is part of an asymmetric cryptographic pair comprising the first third-party public key (P1T) and a first third-party private key (V1T) The method further comprises the steps of hashing the first script to generate a first script hash and publishing the first script and the first script hash on a distributed hash table (DHT).

23 Claims, 15 Drawing Sheets

(51) Int. Cl.
*G06F 16/22* (2019.01)
*G06F 16/23* (2019.01)
*G06Q 20/06* (2012.01)
*G06Q 20/12* (2012.01)
*G06Q 20/22* (2012.01)
*G06Q 50/16* (2012.01)
*H04L 9/30* (2006.01)
*H04L 9/32* (2006.01)

(52) U.S. Cl.
CPC ..... *G06Q 20/0655* (2013.01); *G06Q 20/1235* (2013.01); *G06Q 20/223* (2013.01); *G06Q 20/381* (2013.01); *G06Q 20/389* (2013.01); *G06Q 20/3825* (2013.01); *G06Q 20/3827* (2013.01); *G06Q 50/167* (2013.01); *H04L 9/3073* (2013.01); *H04L 9/321* (2013.01); *G06Q 2220/00* (2013.01); *H04L 2209/38* (2013.01)

(58) Field of Classification Search
CPC .. G06Q 20/381; G06Q 20/389; G06Q 50/167; G06Q 20/1235; G06Q 2220/00; G06F 16/2365; G06F 16/2255; H04L 9/3073; H04L 9/321; H04L 2209/38
USPC .................. 705/16, 21; 380/44, 262
See application file for complete search history.

(56) References Cited

U.S. PATENT DOCUMENTS

| | | |
|---|---|---|
| 5,867,578 A | 2/1999 | Brickell et al. |
| 5,889,865 A | 3/1999 | Vanstone et al. |
| 5,896,455 A | 4/1999 | Vanstone et al. |
| 5,933,504 A | 8/1999 | Vanstone et al. |
| 6,061,449 A | 5/2000 | Candelore et al. |
| 6,078,667 A | 6/2000 | Johnson |
| 6,118,874 A | 9/2000 | Okamoto et al. |
| 6,122,736 A | 9/2000 | Vanstone et al. |
| 6,141,420 A | 10/2000 | Vanstone et al. |
| 6,618,483 B1 | 9/2003 | Vanstone et al. |
| 6,662,299 B1 | 12/2003 | Price, III |
| 6,704,870 B2 | 3/2004 | Vanstone et al. |
| 6,785,813 B1 | 8/2004 | Vanstone et al. |
| 6,792,530 B1 | 9/2004 | Qu et al. |
| 7,006,633 B1 | 2/2006 | Reece |
| 7,095,851 B1 | 8/2006 | Scheidt |
| 8,520,855 B1 | 8/2013 | Kohno et al. |
| 8,522,011 B2 | 8/2013 | Spalka et al. |
| 8,855,318 B1 | 10/2014 | Patnala et al. |
| 9,209,980 B2 | 12/2015 | Bowman et al. |
| 9,258,130 B2 | 2/2016 | Hwang et al. |
| 9,298,806 B1 | 3/2016 | Vessenes et al. |
| 9,673,975 B1 | 6/2017 | Machani |
| 10,050,779 B2 | 8/2018 | Alness et al. |
| 10,068,228 B1 | 9/2018 | Winklevoss et al. |
| 10,510,053 B2 | 12/2019 | Armstrong |
| 10,516,527 B1 | 12/2019 | Machani et al. |
| 10,659,223 B2 | 5/2020 | Wright et al. |
| 10,719,816 B1 | 7/2020 | Kurani |
| 11,115,196 B1 | 9/2021 | Triandopoulos et al. |
| 2001/0050990 A1 | 12/2001 | Sudia |
| 2002/0112171 A1 | 8/2002 | Ginter et al. |
| 2002/0198791 A1 | 12/2002 | Perkowski |
| 2003/0026432 A1 | 2/2003 | Woodward |
| 2003/0046202 A1 | 3/2003 | Knapp |
| 2003/0048906 A1 | 3/2003 | Vora et al. |
| 2003/0188153 A1 | 10/2003 | Demoff et al. |
| 2004/0030932 A1 | 2/2004 | Juels et al. |
| 2004/0049687 A1 | 3/2004 | Orsini et al. |
| 2004/0078775 A1 | 4/2004 | Chow et al. |
| 2004/0193890 A1 | 9/2004 | Girault |
| 2005/0071283 A1 | 3/2005 | Randle et al. |
| 2005/0138374 A1 | 6/2005 | Zheng et al. |
| 2006/0023887 A1 | 2/2006 | Agrawal et al. |
| 2006/0153368 A1 | 7/2006 | Beeson |
| 2006/0156013 A1 | 7/2006 | Beeson |
| 2006/0161485 A1 | 7/2006 | Meldahl |
| 2006/0179319 A1 | 8/2006 | Krawczyk |
| 2006/0248114 A1 | 11/2006 | Anderson et al. |
| 2007/0055880 A1 | 3/2007 | Lauter et al. |
| 2007/0192842 A1 | 8/2007 | Beaulieu et al. |
| 2007/0223706 A1 | 9/2007 | Gantman et al. |
| 2007/0265978 A1 | 11/2007 | Kahn et al. |
| 2007/0276836 A1 | 11/2007 | Chatterjee et al. |
| 2008/0082817 A1 | 4/2008 | Takahashi et al. |
| 2008/0101596 A1 | 5/2008 | Cerruti et al. |
| 2008/0137857 A1 | 6/2008 | Bellare et al. |
| 2008/0144836 A1 | 6/2008 | Sanders et al. |
| 2008/0285759 A1 | 11/2008 | Shaw |
| 2008/0288773 A1 | 11/2008 | Nguyen et al. |
| 2009/0048979 A1 | 2/2009 | Al-Herz et al. |
| 2009/0161876 A1 | 6/2009 | Sherkin |
| 2010/0005302 A1 | 1/2010 | Vishnu et al. |
| 2010/0023771 A1 | 1/2010 | Struik |
| 2010/0031369 A1 | 2/2010 | Grummt |
| 2010/0054458 A1 | 3/2010 | Schneider |
| 2010/0054480 A1 | 3/2010 | Schneider |
| 2010/0131752 A1 | 5/2010 | Flegel |
| 2010/0131755 A1 | 5/2010 | Zhu et al. |
| 2010/0134848 A1 | 6/2010 | Lynggaard et al. |
| 2010/0150341 A1 | 6/2010 | Dodgson et al. |
| 2010/0172501 A1 | 7/2010 | Tian et al. |
| 2010/0199095 A1 | 8/2010 | Ho |
| 2010/0217986 A1 | 8/2010 | Schneider |
| 2010/0228973 A1 | 9/2010 | Dancer et al. |
| 2010/0241848 A1 | 9/2010 | Smith et al. |
| 2011/0016510 A1 | 1/2011 | Matsuda et al. |
| 2011/0022854 A1 | 1/2011 | Macchetti et al. |
| 2011/0202773 A1 | 8/2011 | Ghouti et al. |
| 2011/0246766 A1 | 10/2011 | Orsini et al. |
| 2011/0307698 A1 | 12/2011 | Vanstone |
| 2011/0311051 A1 | 12/2011 | Resch et al. |
| 2012/0011362 A1 | 1/2012 | Lambert |
| 2012/0039474 A1 | 2/2012 | Ho |
| 2012/0100833 A1 | 4/2012 | Gao |
| 2012/0214441 A1 | 8/2012 | Raleigh |
| 2012/0233674 A1 | 9/2012 | Gladstone et al. |
| 2012/0243687 A1 | 9/2012 | Li et al. |
| 2012/0284794 A1 | 11/2012 | Trent et al. |
| 2012/0290830 A1 | 11/2012 | Resch et al. |
| 2012/0331287 A1 | 12/2012 | Bowman et al. |
| 2013/0051552 A1 | 2/2013 | Handschuh et al. |
| 2013/0061049 A1 | 3/2013 | Irvine |
| 2013/0077783 A1 | 3/2013 | Anshel et al. |
| 2013/0103945 A1 | 4/2013 | Cannon et al. |
| 2013/0177157 A1 | 7/2013 | Li et al. |
| 2013/0191632 A1 | 7/2013 | Spector et al. |
| 2013/0304642 A1 | 11/2013 | Campos |
| 2013/0305057 A1 | 11/2013 | Greco et al. |
| 2014/0012751 A1 | 1/2014 | Kuhn et al. |
| 2014/0068246 A1 | 3/2014 | Hartley et al. |
| 2014/0082358 A1 | 3/2014 | Nakhjiri et al. |
| 2014/0129844 A1 | 5/2014 | Johnson et al. |
| 2014/0223580 A1 | 8/2014 | Neivanov et al. |
| 2014/0250006 A1 | 9/2014 | Makhotin et al. |

(56) References Cited

U.S. PATENT DOCUMENTS

| | | |
|---|---|---|
| 2015/0039470 A1 | 2/2015 | Crites |
| 2015/0052369 A1 | 2/2015 | Koning et al. |
| 2015/0066748 A1 | 3/2015 | Winslow et al. |
| 2015/0086020 A1 | 3/2015 | Harjula et al. |
| 2015/0095648 A1 | 4/2015 | Nix |
| 2015/0120567 A1 | 4/2015 | Van Rooyen et al. |
| 2015/0154562 A1 | 6/2015 | Emmerson |
| 2015/0188698 A1 | 7/2015 | Tsai |
| 2015/0188700 A1 | 7/2015 | Ben Saied et al. |
| 2015/0205929 A1 | 7/2015 | Brama |
| 2015/0206106 A1 | 7/2015 | Yago |
| 2015/0213433 A1 | 7/2015 | Khan |
| 2015/0244690 A1 | 8/2015 | Mossbarger |
| 2015/0254463 A1 | 9/2015 | Ryhorchuk et al. |
| 2015/0256347 A1 | 9/2015 | Tseng et al. |
| 2015/0262139 A1 | 9/2015 | Shtylman |
| 2015/0262140 A1 | 9/2015 | Armstrong |
| 2015/0269570 A1 | 9/2015 | Phan et al. |
| 2015/0294425 A1 | 10/2015 | Benson |
| 2015/0302401 A1 | 10/2015 | Metral |
| 2015/0304302 A1 | 10/2015 | Zhang |
| 2015/0310497 A1 | 10/2015 | Valin et al. |
| 2015/0324764 A1 | 11/2015 | Van Rooyen et al. |
| 2015/0324789 A1 | 11/2015 | Dvorak et al. |
| 2015/0332224 A1 | 11/2015 | Melika et al. |
| 2015/0332395 A1 | 11/2015 | Walker et al. |
| 2015/0348017 A1 | 12/2015 | Allmen |
| 2015/0349958 A1 | 12/2015 | Lindell |
| 2015/0350171 A1 | 12/2015 | Brumley |
| 2015/0356523 A1 | 12/2015 | Madden |
| 2015/0363768 A1 | 12/2015 | Melika et al. |
| 2015/0363770 A1 | 12/2015 | Ronca et al. |
| 2015/0363773 A1 | 12/2015 | Ronca et al. |
| 2015/0363777 A1 | 12/2015 | Ronca et al. |
| 2015/0379510 A1 | 12/2015 | Smith |
| 2015/0381729 A1 | 12/2015 | Manohar et al. |
| 2016/0027229 A1 | 1/2016 | Spanos et al. |
| 2016/0028552 A1 | 1/2016 | Spanos et al. |
| 2016/0071108 A1 | 3/2016 | Caldera et al. |
| 2016/0085955 A1 | 3/2016 | Lerner |
| 2016/0086175 A1 | 3/2016 | Finlow-Bates et al. |
| 2016/0092988 A1 | 3/2016 | Letourneau |
| 2016/0098723 A1 | 4/2016 | Feeney |
| 2016/0132684 A1 | 5/2016 | Barbas et al. |
| 2016/0140335 A1 | 5/2016 | Proulx et al. |
| 2016/0149878 A1 | 5/2016 | Pogorelik et al. |
| 2016/0162897 A1 | 6/2016 | Feeney |
| 2016/0203522 A1 | 7/2016 | Shiffert et al. |
| 2016/0203572 A1 | 7/2016 | McConaghy et al. |
| 2016/0234026 A1 | 8/2016 | Wilkins et al. |
| 2016/0260171 A1 | 9/2016 | Ford et al. |
| 2016/0261408 A1 | 9/2016 | Peddada et al. |
| 2016/0261565 A1 | 9/2016 | Lorenz et al. |
| 2016/0261690 A1 | 9/2016 | Ford |
| 2016/0269182 A1 | 9/2016 | Sriram et al. |
| 2016/0283941 A1 | 9/2016 | Andrade |
| 2016/0292672 A1 | 10/2016 | Fay et al. |
| 2016/0294562 A1 | 10/2016 | Oberheide et al. |
| 2016/0321434 A1 | 11/2016 | McCoy et al. |
| 2016/0335924 A1 | 11/2016 | Ikarashi et al. |
| 2016/0337119 A1 | 11/2016 | Hosaka et al. |
| 2016/0337124 A1 | 11/2016 | Rozman |
| 2016/0342977 A1 | 11/2016 | Lam |
| 2016/0342994 A1 | 11/2016 | Davis |
| 2016/0344543 A1 | 11/2016 | Aness et al. |
| 2016/0350749 A1 | 12/2016 | Wilkins et al. |
| 2016/0352518 A1 | 12/2016 | Ford et al. |
| 2016/0379208 A1 | 12/2016 | Deliwala et al. |
| 2017/0005804 A1 | 1/2017 | Zinder |
| 2017/0011394 A1 | 1/2017 | Kumar et al. |
| 2017/0012948 A1 | 1/2017 | Peeters et al. |
| 2017/0017936 A1 | 1/2017 | Bisikalo et al. |
| 2017/0024817 A1 | 1/2017 | Wager et al. |
| 2017/0046664 A1 | 2/2017 | Haldenby et al. |
| 2017/0046698 A1 | 2/2017 | Haldenby et al. |
| 2017/0046792 A1 | 2/2017 | Haldenby et al. |
| 2017/0075877 A1 | 3/2017 | Lepeltier |
| 2017/0083910 A1 | 3/2017 | Kraemer et al. |
| 2017/0091750 A1 | 3/2017 | Maim |
| 2017/0103385 A1 | 4/2017 | Wilson, Jr. et al. |
| 2017/0124348 A1 | 5/2017 | Pourzandi et al. |
| 2017/0132621 A1 | 5/2017 | Miller et al. |
| 2017/0148016 A1 | 5/2017 | Davis |
| 2017/0154331 A1 | 6/2017 | Voorhees |
| 2017/0178237 A1 | 6/2017 | Wong |
| 2017/0178263 A1 | 6/2017 | Kraemer et al. |
| 2017/0187535 A1 | 6/2017 | Middleton et al. |
| 2017/0200137 A1 | 7/2017 | Vilmont |
| 2017/0228547 A1 | 8/2017 | Smith et al. |
| 2017/0243193 A1 | 8/2017 | Manian et al. |
| 2017/0250801 A1 | 8/2017 | Chen et al. |
| 2017/0300877 A1 | 10/2017 | Mann et al. |
| 2017/0316390 A1 | 11/2017 | Smith et al. |
| 2017/0324715 A1 | 11/2017 | Frincu et al. |
| 2018/0025670 A1 | 1/2018 | Ikarashi et al. |
| 2018/0034810 A1 | 2/2018 | Pe'Er et al. |
| 2018/0109377 A1 | 4/2018 | Fu |
| 2018/0123780 A1 | 5/2018 | Ikarashi |
| 2018/0146367 A1 | 5/2018 | Altin et al. |
| 2018/0176017 A1 | 6/2018 | Rodriguez et al. |
| 2018/0176222 A1 | 6/2018 | Bhaskar et al. |
| 2018/0225431 A1 | 8/2018 | Ikarashi et al. |
| 2018/0240107 A1 | 8/2018 | Andrade |
| 2018/0247191 A1 | 8/2018 | Katz et al. |
| 2018/0341648 A1 | 11/2018 | Kakavand et al. |
| 2018/0349572 A1 | 12/2018 | Chen et al. |
| 2018/0367298 A1 | 12/2018 | Wright et al. |
| 2018/0376318 A1 | 12/2018 | Wang et al. |
| 2019/0014094 A1 | 1/2019 | Le Saint |
| 2019/0034936 A1 | 1/2019 | Nolan et al. |
| 2019/0080321 A1 | 3/2019 | Mundis et al. |
| 2019/0080404 A1 | 3/2019 | Molinari et al. |
| 2019/0080406 A1 | 3/2019 | Molinari et al. |
| 2019/0130368 A1 | 5/2019 | Li et al. |
| 2019/0149337 A1 | 5/2019 | Savanah et al. |
| 2019/0158470 A1 | 5/2019 | Wright et al. |
| 2019/0188793 A1 | 6/2019 | Molinari et al. |
| 2019/0199531 A1 | 6/2019 | Staples et al. |
| 2019/0220859 A1 | 7/2019 | Weight et al. |
| 2019/0229911 A1 | 7/2019 | Allen |
| 2019/0238334 A1 | 8/2019 | Nakamura |
| 2019/0340352 A1 | 11/2019 | Peeters et al. |
| 2019/0349733 A1 | 11/2019 | Nolan et al. |
| 2019/0392118 A1 | 12/2019 | Elden et al. |
| 2019/0392536 A1 | 12/2019 | Rice |
| 2020/0026785 A1 | 1/2020 | Patangia et al. |
| 2020/0285935 A1* | 9/2020 | Song .................. G06N 3/063 |
| 2021/0056070 A1 | 2/2021 | Kakavand et al. |
| 2021/0194677 A1 | 6/2021 | Pourzandi et al. |

FOREIGN PATENT DOCUMENTS

| | | |
|---|---|---|
| CN | 101447980 A | 6/2009 |
| CN | 102144371 A | 8/2011 |
| CN | 103440209 A | 12/2013 |
| CN | 103927656 A | 7/2014 |
| CN | 104320262 A | 1/2015 |
| CN | 105204802 A | 12/2015 |
| DE | 102010002241 B4 | 3/2012 |
| EP | 1477882 A2 | 11/2004 |
| EP | 2538606 A1 | 12/2012 |
| EP | 2975570 A1 | 1/2016 |
| EP | 3010176 A1 | 4/2016 |
| FR | 3018370 A1 | 9/2015 |
| FR | 3018377 A1 | 9/2015 |
| FR | 3018378 A1 | 9/2015 |
| FR | 3018379 A1 | 9/2015 |
| JP | H11239124 A | 8/1999 |
| JP | H11289324 A | 10/1999 |
| JP | 2000502553 A | 2/2000 |
| JP | 2001195479 A | 7/2001 |
| JP | 2002026895 A | 1/2002 |
| JP | 2006293764 A | 10/2006 |
| JP | 2007242221 A | 9/2007 |

(56) References Cited

FOREIGN PATENT DOCUMENTS

| | | |
|---|---|---|
| JP | 2008146601 A | 6/2008 |
| JP | 2009105824 A | 5/2009 |
| JP | 2009526411 A | 7/2009 |
| JP | 2010503320 A | 1/2010 |
| JP | 2010219912 A | 9/2010 |
| JP | 2011082662 A | 4/2011 |
| JP | 2011211461 A | 10/2011 |
| JP | 2014068140 A | 4/2014 |
| JP | 2015536617 A | 12/2015 |
| JP | 5858506 B1 | 2/2016 |
| RU | 2015108134 A | 10/2016 |
| RU | 2015109271 A | 10/2016 |
| TW | 201202975 A | 1/2012 |
| WO | 2005096542 A1 | 10/2005 |
| WO | 2005107141 A1 | 11/2005 |
| WO | 2007113040 A1 | 10/2007 |
| WO | 2012039474 A1 | 3/2012 |
| WO | 2012054785 A1 | 4/2012 |
| WO | 2013053058 A1 | 4/2013 |
| WO | 2015127789 A1 | 9/2015 |
| WO | 2015142765 A1 | 9/2015 |
| WO | 2015171580 A1 | 11/2015 |
| WO | 2015175854 A2 | 11/2015 |
| WO | 2015188151 A1 | 12/2015 |
| WO | 2016022864 A2 | 2/2016 |
| WO | 2016137360 A2 | 9/2016 |
| WO | 2016161073 A1 | 10/2016 |
| WO | 2017112664 A1 | 6/2017 |

OTHER PUBLICATIONS

Goldfeder et al., "Threshold signatures and Bitcoin wallet security: A menu of options," Freedom to Tinker, May 23, 2014 [retrieved Nov. 16, 2020], https://freedom-to-tinker.com/2014/05/23/threshold-signatures-and-bitcoin-wallet-security-a-menu-of-options/, 3 pages.

Gutoski et al., "Hierarchical deterministic Bitcoin wallets that tolerate key leakage (Short paper)," Financial Cryptography and Data Security: 19th International Conference, FC 2015, Revised Selected Papers, Jan. 26, 2015, 9 pages.

Hao, "On Robust Key Agreement Based on Public Key Authentication," International Conference on Financial Cryptography and Data Security, Jan. 25, 2010, 12 pages.

Harayama et al., "Key escrow method of personal decryptographic key by using elliptic curve calculation," Institute of Electronics, Information and Communication Engineers (IEICE) Technical Report 109(85):91-96, Jun. 11, 2009.

Hearn, "Distributed markets," Bitcoin Wiki, https://en.bitcoin.it/wiki/Distributed_markets, Jul. 11, 2015 [retrieved Sep. 20, 2016], 5 pages.

Herbert et al., "A Novel Method for Decentralised Peer-to-Peer Software License Validation Using Cryptocurrency Blockchain Technology," Proceedings of the 38th Australasian Computer Science Conference, Jan. 27, 2015, 9 pages.

International Search Report and Written Opinion dated Apr. 10, 2017, Patent Application No. PCT/IB2017/050861, 11 pages.

International Search Report and Written Opinion dated Apr. 12, 2017, Patent Application No. PCT/IB2017/050829, 9 pages.

International Search Report and Written Opinion dated Apr. 12, 2017, Patent Application No. PCT/IB2017/050866, 10 pages.

International Search Report and Written Opinion dated Apr. 26, 2017, International Patent Application No. PCT/IB2017/050865, filed Feb. 16, 2017, 9 pages.

International Search Report and Written Opinion dated Apr. 3, 2017, Patent Application No. PCT/IB2017/050824, filed Feb. 14, 2017, 13 pages.

International Search Report and Written Opinion dated Apr. 3, 2017, Patent Application No. PCT/IB2017/050827, 10 pages.

International Search Report and Written Opinion dated Mar. 29, 2017, Patent Application No. PCT/IB2017/050821, 10 pages.

International Search Report and Written Opinion dated Mar. 30, 2017, Patent Application No. PCT/IB2017/050825, 9 pages.

International Search Report and Written Opinion dated May 29, 2017, International Patent Application No. PCT/IB2017/050815, filed Feb. 14, 2017, 10 pages.

International Search Report and Written Opinion dated May 31, 2017, Patent Application No. PCT/IB2017/050856, filed Feb. 16, 2017, 11 pages.

International Search Report and Written Opinion dated May 31, 2017, Patent Application No. PCT/IB2017/050867, 11 pages.

International Search Report and Written Opinion dated May 31, 2017, Patent Application No. PCT/IB2017/050979, filed Feb. 21, 2017, 11 pages.

International Search Report and Written Opinion dated May 31, 2017, Patent Application No. PCT/IB2017/050980, 12 pages.

Japanese Notice of Reason(s) for Rejection dated Mar. 30, 2021, Patent Application No. 2018-539890, 8 pages.

Japanese Notice of Reason(s) for Rejection dated Mar. 30, 2021, Patent Application No. 2018-539893, 6 pages.

Japanese Office Action dated Feb. 16, 2021, Patent Application No. 2018-539331, 7 pages.

Japanese Office Action dated Jan. 22, 2019, Patent Application No. 2018-516682, filed Feb. 16, 2017, 14 pages.

Japanese Office Action dated Oct. 6, 2020, Patent Application No. 2018-539865, 14 pages.

Japanese Office Action dated Oct. 8, 2019, Patent Application No. 2018-539895, 9 pages.

Jesionek et al., "BIP0032: Hierarchical Deterministic Wallets," GitHub, https://github.com/bitcoin/bips/blob/master/bip-0032.mediawiki, Jan. 2014, 9 pages.

Il2012 et al., "MinAddress : Now remember your addresses easily," BitCoinTalk, Sep. 16, 2014 (retrieved Jun. 16, 2020), https://bitcointalk.org/index.php?topic=774741.150;wap2, 3 pages.

Kens et al., "Cryptocontracts Will Turn Contract Law Into a Programming Language ," Hacker News, Feb. 23, 2014, https://news.ycombinator.com/item?id=7287155, 12 pages.

Killerstorm et al., "Transcript for #bitcoin-dev Sep. 3, 2012," BitcoinStats, http://www.bitcoinstats.com/irc/bitcoin-dev/logs/2012/09/03, Sep. 3, 2012 [retrieved Dec. 21, 2018], 14 pages.

Koblitz et al., "Cryptocash, Cryptocurrencies, and Cryptocontracts," Designs, Codes and Cryptography 78(1):87-102, publication available online Oct. 1, 2015, print publication Jan. 2016.

Kosba et al., "Hawk: The Blockchain Model of Cryptography and Privacy-Preserving Smart Contracts," IEEE Symposium on Security and Privacy, May 22, 2016, 31 pages.

Kravchenko, "Distributed multi-ledger model for financial industry," Github.com, Oct. 21, 2015 [retrieved Jan. 30, 2017], https://github.com/WebOfTrustInfo/rebooting-the-web-of-trust/blob/master/topics-andadvance-readings/DistributedMulti-ledgerModelForFinancialIndustry.md, 2 pages.

Krawczyk, "HMQV: A High-Performance Secure Diffie-Hellman Protocol," Annual International Cryptology Conference 2005, Aug. 14, 2005, first disclosed online Jul. 5, 2005, 66 pages.

Krellenstein, "The Counterparty Protocol," GitHub, https://github.com/jsimnz/Counterparty/blob/master/README.md, Jan. 8, 2014 [Dec. 12, 2018], 4 pages.

Mainelli, "Blockchain: why smart contracts need shrewder people," Banking Technology, Apr. 4, 2016 [retrieved Jan. 30, 2017], http://www.bankingtech.com/461572/blockchain-why-smart-contracts-need-shrewderpeople/, 3 pages.

Maxwell et al., "Deterministic wallets," Bitcoin Forum, https://bitcointalk.org/index.php?topic=19137.0;all, Jun. 18, 2011 [retrieved Dec. 10, 2018], 104 pages.

McCorry et al., "Authenticated Key Exchange over Bitcoin," International Conference on Research in Security Standardisation 2015, Dec. 15, 2015, 18 pages.

Menezes et al., "Handbook of Applied Cryptography: pp. 33, 38," CRC Press, Oct. 16, 1996, 3 pages.

Mezzomix et al., "Angebot: BTC (2-aus-3) Multisig Escrow (Treuhandabwicklung)," Bitcoin Forum, Feb. 9, 2014, https://bitcointalk.org/index.php?topic=456563.0, 7 pages.

(56) References Cited

OTHER PUBLICATIONS

Mike et al., "Contract," Bitcoin Wiki, Oct. 22, 2015 version (first disclosed May 22, 2011) [retrieved May 12, 2020], https://en.bitcoin.it/w/index.php?title=Contract&oldid=59172, 11 pages.
Minsky et al., "Computation: Finite and Infinite Machines Chapter 14: Very Simple Bases for Computability," Prentice Hall, Inc, 1967, 29 pages.
MrBAndrews, "Bitcoin Core 0.11 (ch 2): Data Storage," Bitcoin Wiki, Jan. 13, 2016 (last revision Jan. 21, 2016) [retrieved May 8, 2020], https://en.bitcoin.it/w/index.php?title=Bitcoin_Core_0.11_(ch_2):_Data_storage&oldid=60024, 10 pages.
Mülli, "A Decentralized Bitcoin Exchange with Bitsquare—Attack Scenarios and Countermeasures," University of Zurich Department of Informatics Communication Systems Group Master Thesis, Jul. 30, 2015, 61 pages.
Nakamoto, "Bitcoin: A Peer-to-Peer Electronic Cash System," Bitcoin, Oct. 31, 2008, https://bitcoin.org/bitcoin.pdf, 9 pages.
Noizat, "Handbook of Digital Currency Chapter 22: Blockchain Electronic Vote," Elsevier Inc., David Lee Kuo Chuen (ed.), May 2015, 9 pages.
Openchain, "Home Page," openchain.org, Dec. 22, 2015 [retrieved May 8, 2020], https://web.archive.org/web/20151222083734/https://www.openchain.org/, 18 pages.
Openssl Wiki, "Elliptic Curve Diffie Hellman," OpenSSL, https://wiki.openssl.org/index.php/Elliptic_Curve_Diffie_Hellman, Mar. 10, 2014 [retrieved Dec. 10, 2018], 5 pages.
Openssl Wiki, "EVP Key Agreement," OpenSSL, https://wiki.openssl.org/index.php/EVP_Key_Agreement, Apr. 28, 2017 [retrieved Dec. 10, 2018], 2 pages.
Perry, "Tapeke: Bitcoin Accounting for Non-Accountants," http://codinginmysleep.com/tapeke-bitcoin-accounting-for-non-accountants/, Jan. 21, 2015, 1 page.
Poon et al., "The Bitcoin Lightning Network: Scalable Off-Chain Instant Payments," https://www.bitcoinlightning.com/wp-content/uploads/2018/03/lightning-network-paper.pdf, Jan. 14, 2016 [retrieved Dec. 10, 2018], 59 pages.
Pornin, "Deterministic Usage of the Digital Signature Algorithm (DSA) and Elliptic Curve Digital Signature Algorithm (ECDSA)," Request for Comments: 6979, Independent Submission, Aug. 2013, 79 pages.
Reddit, "Could Microsoft use the blockchain as a license key for it's software?," r/Bitcoin, Sep. 7, 2015 [retrieved May 8, 2020], https://www.reddit.com/r/Bitcoin/comments/3jz09c/could_microsoft_use_the_blockchain_as_a_license/?st=iw26pndq&sh=b862bf7d, 2 pages.
Reiner et al., "Bitcoin Wallet Identity Verification Specification," diyhpluswiki, http://diyhpl.us/-bryan/papers2/bitcoin/armory-verisign-bitcoin-wallet-identityspecification.pdf, Feb. 27, 2015 (retrieved Jan. 27, 2016), 24 pages.
Ryepdx et al., "Answer to What is the Global Registrar?," Ethereum Stack Exchange, Feb. 26, 2016 [retrieved Jan. 30, 2017], http://ethereum.stackexchange.com/questions/1610/what-is-the-global-registrar, 3 pages.
Sams, "Ethereum: Turing-complete, programmable money," Cryptonomics, Feb. 1, 2014, https://cryptonomics.org/2014/02/01/ethereum-turing-complete-programmable-money, 4 pages.
Sanchez, "Marketplaces," GitHub, Jun. 10, 2015 [retrieved May 12, 2020], https://github.com/drwasho/openbazaar-documentation/blob/master/04%20Marketplaces.md, 37 pages.
Sanchez, "Protocol," Github, https://github.com/drwasho/openbazaar-documentation/blob/master/03%20Protocol.md, Jun. 15, 2015, 53 pages.
Sanchez, "Ricardian Contracts in OpenBazaar," Github, https://gist.github.com/drwasho/a5380544c170bdbbbad8, Jan. 2016, 12 pages.
Sardesai, "Coinffeine: A P2P Alternative to Centralised Bitcoin Exchanges," Cryptocoins News, Mar. 2, 2014 [retrieved Feb. 14, 2017], https://www.cryptocoinsnews.com/coinffeine-p2p-alternative-centralised-bitcoin-exchanges/, 5 pages.
Scott, "Counterparty to Create First Peer-to-Peer Digital Asset Exchange Platform," Cointelegraph, https://cointelegraph.com/news/counterparty_to_create_first_peer_to_peer_digital_asset_exchange_platform, Apr. 10, 2014 [retrieved Dec. 12, 2018], 2 pages.
Sevareid et al., "Use Case Asset Depository," Github.com, Jan. 11, 2016 version (last edited May 5, 2016) [retrieved Jan. 30, 2017], https://github.com/hyperledger/hyperledger/wiki/Use-Case-Asset-Depository, 4 pages.
Snow et al., "Factom: Business Processes Secured by Immutable Audit Trails on the Blockchain Version 1.2," factom.com, Apr. 25, 2018, 38 pages.
Stampery, "Features: Blockchain-based data certification at your fingertips," Stampery.com, https://stampery.com/features/, archived Mar. 5, 2016 [retrieved Nov. 3, 2016], 4 pages.
Sullivan et al., "Peer-to-peer Affine Commitment using Bitcoin," Carnegie Mellon University, Jun. 17, 2015, 54 pages.
Swanson, "Great Chain of Nos. Chapter 3: Next Generation Platforms," Great Wall of Numbers, Mar. 4, 2014 [retrieved Jan. 30, 2017], http://www.ofnumbers.com/2014/03/04/chapter-3-next-generation-platforms/, 25 pages.
Taiwanese Office Action dated Apr. 12, 2021, Patent Application No. 109142412, 5 pages.
Taiwanese Office Action dated Jul. 28, 2020, Patent Application No. 106105709, 9 pages.
Taiwanese Office Action dated Oct. 7, 2020, Patent Application No. 106105713, 4 pages.
Tasca et al., "Digital Currencies: Principles, Trends, Opportunities, and Risks," ECUREX Research Working Paper, Sep. 7, 2015 (Oct. 2015 version), 110 pages.
Third-Party Submission Under 37 CFR 1.290 dated Jun. 12, 2019, U.S. Appl. No. 16/078,605, filed Aug. 21, 2018, 31 pages.
Third-Party Submission Under 37 CFR 1.290 dated Jun. 12, 2019, U.S. Appl. No. 16/079,089, filed Aug. 22, 2018, 19 pages.
Timeisnow77724 et al., "Help understanding counterparty, thanks in advance!," Reddit r/counterparty_xcp, https://www.reddit.com/r/counterparty_xcp/comments/2qntze/help_understanding_counterparty_thanks_in_advance/, Dec. 28, 2014 [retrieved Dec. 11, 2018], 4 pages.
Toomim, "P2pool as prior art for nChain's Turing Complete Transactions patent—or, how to patent all blockchain apps without anybody noticing," Medium, Sep. 3, 2018, https://medium.com/@j_73307/p2pool-as-prior-art-for-nchains-turing-complete-transactions-patent-or-how-to-patent-all-40f3d429eaa4, 13 pages.
Tuesta et al., "Smart contracts: the ultimate automation of trust?," BBVA Research Financial Inclusion Unit, Oct. 2015, 5 pages.
UK Commercial Search Report dated Apr. 25, 2016, Patent Application No. 11603117.1, filed Feb. 23, 2016, 11 pages.
UK Commercial Search Report dated Feb. 17, 2017, Patent Application No. 1604493.5, 8 pages.
UK Commercial Search Report dated Jan. 13, 2017, Patent Application No. 1604498.4, 8 pages.
UK Commercial Search Report dated Jun. 14, 2016, Patent Application No. 1607249.8, 4 pages.
UK Commercial Search Report dated Jun. 27, 2016, Patent Application No. GB1603123.9, filed Feb. 23, 2016, 11 pages.
UK Commercial Search Report dated Jun. 27, 2016, Patent Application No. GB 1603125.4, filed Feb. 23, 2016, 11 pages.
UK Commercial Search Report dated Jun. 28, 2016, Patent Application No. GB 1603122.1, filed Feb. 23, 2016, 12 pages.
UK Commercial Search Report dated Jun. 6, 2016, Patent Application No. 1604497.6, filed Mar. 16, 2016, 6 pages.
UK Commercial Search Report dated Jun. 9, 2016, Patent Application No. GB1603117.1, filed Feb. 23, 2016, 12 pages.
UK Commercial Search Report dated May 20, 2016, Patent Application No. 1605026.2, 4 pages.
UK Commercial Search Report dated May 24, 2016, Patent Application No. GB1605571.7, filed Apr. 1, 2016, 3 pages.
UK Commercial Search Report mailed May 9, 2016, Patent Application No. GB1603114.8, filed Feb. 23, 2016, 2 pages.
UK Commercial Search Report dated Nov. 14, 2016, Patent Application No. GB1607063.3, 8 pages.
UK Commercial Search Report dated Nov. 30, 2016, Patent Application No. 1607058.3, filed Apr. 22, 2016, 7 pages.
UK Commercial Search Report dated Sep. 30, 2016, Patent Application No. 1606630.0, filed Apr. 15, 2016, 7 pages.

(56) References Cited

OTHER PUBLICATIONS

UK Expanded Commercial Search Report dated Jun. 15, 2016, Patent Application No. 1605026.2, 5 pages.
UK IPO Search Report dated Dec. 12, 2016, Patent Application No. GB1606630.0, filed Apr. 15, 2016, 4 pages.
UK IPO Search Report dated Dec. 15, 2016, Patent Application No. GB1607063.3, 6 pages.
UK IPO Search Report dated Dec. 21, 2016, Patent Application No. GB1607058.3, filed Apr. 22, 2016, 3 pages.
UK IPO Search Report dated Dec. 28, 2016, Patent Application No. GB1604497.6, filed Mar. 16, 2016, 4 pages.
UK IPO Search Report dated Dec. 5, 2016, Patent Application No. 1607249.8, 4 pages.
UK IPO Search Report dated Dec. 6, 2016, Patent Application No. 1604493.5, 6 pages.
UK IPO Search Report dated Dec. 6, 2016, Patent Application No. 1607482.5, 5 pages.
UK IPO Search Report dated Jan. 25, 2017, Patent Application No. 1605026.2, 3 pages.
UK IPO Search Report dated Jan. 3, 2017, Patent Application No. 1604498.4, 4 pages.
UK IPO Search Report dated Jul. 26, 2016, Patent Application No. GB1603114.8, filed Feb. 23, 2016, 5 pages.
UK IPO Search Report dated Jul. 4, 2016, Patent Application No. GB1603125.4, filed Feb. 23, 2016, 6 pages.
UK IPO Search Report dated Jul. 5, 2016, Patent Application No. GB1603123.9, filed Feb. 23, 2016, 5 pages.
UK IPO Search Report dated Oct. 17, 2016, Patent Application No. GB1603117.1, filed Feb. 23, 2016, 5 pages.
UK IPO Search Report dated Oct. 26, 2016, Patent Application No. GB1603122.1, filed Feb. 23, 2016, 4 pages.
UK IPO Search Report dated Sep. 9, 2016, Patent Application No. GB1605571.7, filed Apr. 1, 2016, 5 pages.
Vayngrib, "DHT hardening," GitHub, https://github.com/tradle/about/wiki/DHT-hardening, Feb. 2, 2015 (last updated May 21, 2015) [retrieved Dec. 13, 2018], 5 pages.
Vayngrib, "Future, operating business on chain," Github.com, May 4, 2015 [retrieved Jan. 30, 2017], https://github.com/tradle/about/wiki/Future,-operating-business-on-chain, 9 pages.
Vietnamese Office Action dated Sep. 27, 2018, Patent Application No. 1-2018-03358, filed Feb. 16, 2017, 2 pages.
Walport et al., "Distributed Ledger Technology: beyond block chain—A report by the UK Government Chief Scientific Adviser," United Kingdom Government Office for Science, Dec. 2015, 88 pages.
Watanabe et al., "Blockchain contract: A complete consensus using blockchain," IEEE 4th Global Conference on Consumer Electronics, Oct. 27, 2015, 3 pages.
Weller et al., "CounterpartyXCP/Documentation: Protocol Specification," Github.com, Jan. 25, 2015 (last edited Jun. 17, 2019) [retrieved Jan. 13, 2020], 10 pages.
Whitequark, "#bitcoin-wizards on Jul. 30, 2015—irc logs at whitequark.org," whitequark.org, https://irclog.whitequark.org/bitcoin-wizards/2015-07-30, Jul. 30, 2015 [retrieved Dec. 12, 2018], 8 pages.
Wikipedia, "Counterparty (platform)," last edited Dec. 6, 2019 [retrieved Jan. 13, 2020], 2 pages.
Wikipedia, "Shamir's Secret Sharing," Wikipedia the Free Encyclopedia, Jan. 20, 2017 version [retrieved on Jan. 9, 2019], https://en wikipedia.org/w/index php?title=Shamir's_Secret_Sharing&oldid=761082071, 6 pages.
Wikipedia, "Shamir's Secret Sharing," Wikipedia the Free Encyclopedia, Mar. 6, 2016 version [retrieved on Jun. 24, 2019], https://en.wikipedia.org/w/index.php?title=Shamir's_Secret_Sharing&oldid=708636892, 6 pages.
Willet et al., "Omni Protocol Specification (formerly Mastercoin)," Github, Nov. 5, 2013 [retrieved May 12, 2020], https://github.com/OmniLayer/spec/blob/9978cc3984ae0b6e51216c4ae74042fc4097b993/README.md, 69 pages.
Willoms et al., "Using blockchain to save and verify software licensing," Bitcoin Forum, https://bitcointalk.org/index.php?topic=671435.0, Jun. 30, 2014 [retrieved Dec. 13, 2018], 3 pages.
Wood, "Ethereum: A Secure Decentralised Generalised Transaction Ledger: Final Draft—Under Review," Etereum Project Yellow Paper, http://tech.lab.carl.pro/kb/ethereum/yellowpaper, Apr. 2014, 32 pages.
Wright, "Registry and Automated Management Method for Blockchain Enforced Smart Contracts," U.S. Appl. No. 15/138,717, filed Apr. 26, 2016.
Wuille, "Hierarchical Deterministic Wallets," Github, https://github.com/bitcoin/bips/blob/ab90b5289f0356282397fa9b8aa47d2238a7b380/bip-0032.mediawiki, Feb. 12, 2016 (retrieved Mar. 23,2017), 9 pages.
Yaokai et al., "Experimental evaluation of the next-generation cryptocurrency platform Ethereum," CSS2015 Computer Security Symposium 2015 Proceedings 2015(3):1151-1158, Oct. 14, 2015.
Zhang et al., "AntShare Trading Platform," Github.com, Jun. 3, 2016 (last edited Aug. 21, 2016) [retrieved Jan. 30, 2017], https://github.com/AntShares/AntShares/wiki/Whitepaper-1.1, 9 pages.
Zyskind et al., "Decentralizing Privacy: Using a Blockchain to Protect Personal Data," 2015 IEEE CS Security and Privacy Workshops, May 21, 2015, 5 pages.
Zyskind et al., "Enigma: Decentralized Computation Platform with Guaranteed Privacy," arXiv preprint arXiv:1506, Jun. 10, 2015, 14 pages.
Abeikverdi et al., "Generating interactive, secure multiple ECC key pairs deterministically," StackExchange, http://crypto.stackexchange.com/questions/25191/generating-interactivesecure-multiple-ecc-key-pairs-deterministically, Apr. 23, 2015 [retrieved Dec. 26, 2016], 2 pages.
Akutsu et al., "Taking on the challenge of creating epoch-making services that impress users. For services that can share the excitement of competitions around the world," NTT Technical Journal 27(5):10-14, May 1, 2015.
Allison, "Symbiont's Adam Krellenstein: There's really only two smart contract systems—Ethereum's and ours," International Business Times, https://www.ibtimes.co.uk/symbionts-adam-krellenstein-theres-really-only-two-smart-sontract-systems-ethereums-ours-1530490, Nov. 25, 2015 [retrieved Dec. 12, 2018], 4 pages.
Andersen, "Blockchain Technology: A game-changer in accounting?," Deloitte & Touche GmbH Wirtschaftsprüfungsgesellschaft, Mar. 2016, 5 pages.
Andresen et al., "Relay OP_RETURN data TxOut as standard transaction type. #2738," Github, Jun. 4, 2013, https://github.com/bitcoin/bitcoin/pull/2738, 12 pages.
Anonymous, "Bitcoin Developer Guide," Bitcoin Project, https://web.archive.org/web/20160515171209/https://bitcoin.org/en/developer-guide, May 15, 2016 [retrieved Mar. 13, 2019], 55 pages.
Anonymous, "Bitsquare—The decentralised bitcoin exchange," Bitsquare.io, Jan. 3, 2016, 14 pages.
Anonymous, "Homepage," website operational as of 2017 [retrieved Nov. 30, 2020], https://www.coinffeine.com/, 2 pages.
Antonopoulos, "Mastering Bitcoin—Unlocking Digital Cryptocurrencies," O'Reilly Media, Inc., Dec. 20, 2014, 282 pages.
bitcoininvestor.com, "All-Star Panel: Ed Moy, Joseph VaughnPerling, Trace Mayer, Nick Szabo, Dr. Craig Wright," YouTube, https://youtu.be/LdvQTwjVmrE, Bitcoin Investor Conference, Oct. 29, 2015 [retrieved Dec. 12, 2018], 1 page.
bitcoininvestor.com, "All-Star Panel: Ed Moy, Joseph VaughnPerling, Trace Mayer, Nick Szabo, Dr. Craig Wright," YouTube, Nov. 12, 2015, https://www.youtube.com/watch?v=LdvQTwjVmrE, 1 page.
Bitfreak! et al., "Understanding Stealth Addresses/Payments," Bitcoin Forum, Jun. 10, 2015 (retrieved Jun. 16, 2020), https://bitcointalk.org/index.php?topic=1086498.0, 8 pages.
BitFury Group, "Smart Contracts on Bitcoin Blockchain," BitFury Group Limited, Aug. 13, 2015 (updated Sep. 4, 2015), http://bitfury.com/content/5-white-papers-research/contracts-1.1.1.pdf, 20 pages.
Block_Chan, "Tweet dated Nov. 7, 2018," Twitter, Nov. 7, 2018, https://twitter.com/block_chan/status/1060336404163584000, 1 page.
Bradbury, "Developers Battle Over Bitcoin Block Chain," Coindesk, http://www.coindesk.com/developers-battle-over-bitcoin-block-chain/, Mar. 25, 2014, 3 pages.

(56) References Cited

OTHER PUBLICATIONS

Brown et al., "Standards for Efficient Cryptography 1: Elliptic Curve Cryptography Version 2.0," Certicom Research, May 21, 2009, 144 pages.

Brown et al., "Standards for Efficient Cryptography 2: Recommended Elliptic Curve Domain Parameters Version 2.0," Certicom Research, Jan. 27, 2010, 37 pages.

Burgess et al., "The Promise of Bitcoin and the Blockchain," Consumers' Research, Jul. 13, 2015, 97 pages.

Buterin, "Bitcoin Multisig Wallet: The Future of Bitcoin," Bitcoin Magazine, Mar. 13, 2014 [retrieved May 12, 2020], https://bitcoinmagazine.com/articles/multisig-future-bitcoin-1394686504, 7 pages.

Buterin, "Secret Sharing DAOs: The Other Crypto 2.0," Ethereum Blog, Dec. 26, 2014 [retrieved Nov. 21, 2019], https://ethereum.github.io/blog/2014/12/26/secret-sharing-daos-crypto-2-0/, 10 pages.

Campagna et al., "Standards for Efficient Cryptography 4: Elliptic Curve Qu-Vanstone Implicit Certificate Scheme (ECQV) Version 1.0," Certicom Research, Jan. 24, 2013, 32 pages.

Charlon et al., "Open-Assests-Protocol," Github.com, Nov. 17, 2015 [retrieved Jan. 30, 2017], https://github.com/OpenAssets/open-assets-protocol/blob/master/specification.mediawiki, 5 pages.

Christidis et al., "Blockchains and Smart Contracts for the Internet of Things," IEEE Access 4(1):2292-2303, May 10, 2016.

Coinprism, "80 bytes OP_RETURN explained," Coinprism Blog, http://blog.coinprism.com/2015/02/11/80-bytes-op-return/, Feb. 11, 2015 [retrieved Dec. 21, 2018], 8 pages.

Corallo, "[Bitcoin-development] Relative CHECKLOCKTIMEVERIFY (was CLTV proposal)," Linux Foundation, https://lists.linuxfoundation.org/pipermail/bitcoin-dev/2015-May/007858.html, May 4, 2015 [retrieved Dec. 12, 2018], 3 pages.

Counterparty, "Home Page," Counterparty, copyright 2018 [retrieved Jan. 13, 2020], counterparty.io, 3 pages.

Danda et al., "hd-wallet-addrs," GitHub, https://github.com/dan-da/hd-wallet-addrs, Dec. 30, 2015 [retrieved Mar. 11, 2016], 7 pages.

Danda et al., "Is there any service/api for deriving HD wallet addresses from a master public key?," StackExchange, http://bitcoin.stackexchange.com/questions/38887/is-there-any-service-api-for-deriving-hdwallet-addresses-from-a-master-public-k, Jul. 30, 2015, 2 pages.

Danda, "Help / FAQ," MyBitPrices, https://mybitprices.info/hd-wallet-addrs.html, Jan. 1, 2016 [retrieved Mar. 11, 2016], 4 pages.

Das, "As Exchanges Pause Withdrawals, Chinese Bitcoin Investors Switch to P2P Trading," CCN, Feb. 13, 2017 [retrieved May 12, 2020], https://www.ccn.com/chinese-bitcoin-investors-switch-p2p-trading-exchanges-pause-withdrawals/, 4 pages.

Dash et al., "bips/bip-0047.mediawiki," Github, Feb. 24, 2016 (retrieved Jun. 16, 2020), https://github.com/bitcoin/bips/blob/15c0b250cb5b77eba3ea709b082d7da6a310d991/bip.0047.mediawiki, 16 pages.

Decker, "[BIP] Normalized transaction IDs," Bitcoin-Dev, https://bitcoin-development.narkive.com/DjOYjEig/bip-normalized-transaction-ids, Oct. 19, 2015 [retrieved Dec. 12, 2018], 16 pages.

Dixon, "True peer-to-peer currency exchange?," DGC Magazine, Jul. 2, 2013 [retrieved May 12, 2020], http://dgcmagazine.com/true-peer-to-peer-currency-exchange/, 6 pages.

Dorier, "Colored Coins and Ricardian Contracts," Coinprism Blog, Dec. 10, 2014 [retrieved Jan. 30, 2017], http://blog.coinprism.com/2014/12/10/colored-coins-and-ricardian-contracts/, 9 pages.

Drcode,"New Kid on the Blockchain," Hacker News, https://news.ycombinator.com/item?id=11372455, Mar. 28, 2016 [Dec. 12, 2018], 32 pages.

Durback, "Standard BIP Draft: Turing Pseudo-Completeness," Bitcoin-Dev, Dec. 10, 2015, https://bitcoin-development.narkive.com/uRciVtAQ/standard-bip-draft-turing-pseudo-completeness, 11 pages.

Eragmus et al., "Time to lobby Bitcoin's core devs: "SF Bitcoin Devs Seminar—Scalability to billions of transactions per day, satoshi-level Micropayments, near-zero risk of custodial theft, & Instant transactions". . . but only w/ a malleability-fixing soft fork," Reddit r/bitcoin, https://www.reddit.com/r/Bitcoin/comments/2z2l91/time_to_lobby_bitcoins_core_devs_sf_bitcoin_devs/, Mar. 14, 2015 [Dec. 12, 2018], 21 pages.

European Communication pursuant to Article 94(3) EPC dated Jan. 2, 2020, Patent Application No. 18166910.2-1218, filed Feb. 16, 2017, 4 pages.

European Communication pursuant to Article 94(3) EPC dated Jul. 1, 2019, Application No. 17707121.4-1218, filed Feb. 14, 2017, 6 pages.

Extended European Search Report dated Jul. 18, 2018, Patent Application No. 18166910.2-1218, filed Feb. 16, 2017, 8 pages.

Familiar et al., "Transcript for #bitcoin-dev Mar. 27, 2015," BitcoinStats, http://bitcoinstats.com/irc/bitcoin-dev/logs/2015/03/27, Mar. 27, 2015 [archived version Jun. 27, 2016], 11 pages.

Fimkrypto, "Fimk 0.6.4 Released," Github.com, Feb. 11, 2016 [retrieved Jan. 30, 2017], https://github.com/fimkrypto/fimk/releases, 17 pages.

Flood et al., "Contract as Automaton: The Computational Representation of Financial Agreements," Office of Financial Research Working Paper No. 15-04, Mar. 26, 2015, 25 pages.

Friedenbach et al., "Freimarkets: extending bitcoin protocol with user-specified bearer instruments, peer-to-peer exchange, off-chain accounting, auctions, derivatives and transitive transactions," Version v0.01, http://freico.in/docs/freimarkets-v0.0.1.pdf, Aug. 24, 2013 [retrieved Dec. 12, 2018], 25 pages.

Friedenbach, "[Bitcoin-development] New Output Script Type," Linux Foundation, Sep. 14, 2013, https://lists.linuxfoundation.org/pipermail/bitcoin-dev/2013-September/003256.html, 2 pages.

Fuchita, "Special Topic: Innovation and Finance, Blockchain and Financial Transaction Innovation," Nomura Capital Market Quarterly 19-2(74):11-35, Nov. 1, 2015.

Gautham, "Bitwage Makes Bitcoin Payroll Easier with New Features," NewsBTC, Mar. 9, 2016 (retrieved Jun. 16, 2020), https://www.newsbtc.com/2016/03/09/bitwage-makes-bitcoin-payroll-easier-new-features/, 4 pages.

Gennaro et al., "Threshold-Optimal DSA/ECDSA Signatures and an Application to Bitcoin Wallet Security," International Conference on Applied Cryptography and Network Security, Jun. 9, 2016, 42 pages.

Gitbook, "Ethereum Frontier Guide," Gitbook (Legacy), Feb. 4, 2016, 293 pages.

Goldfeder et al., "Securing Bitcoin Wallets via a New DSA/ECDSA threshold signature scheme," manuscript, https://www.cs.princeton.edu/~stevenag/threshold_sigs.pdf, 2015 [retrieved Jun. 21, 2018], 26 pages.

Alonso et al., "Digital Economy Outlook," BBVA Research, Oct. 2015, https://www.bbvaresearch.com/wpcontent/uploads/2015/10/Digital_Economy_Outlook_Oct15_Cap1.pdf, 16 pages.

Buterin et al., "Ethereum Development Tutorial," GitHub, Jul. 1, 2014 [retrieved Jul. 20, 2021], https://github.com/ethereum/wiki/wiki/ethereum-development-tutorial/0c1f501ea03a787910049b03723f1bfd7a14c9c6, 13 pages.

International Search Report and Written Opinion dated Mar. 30, 2017, Patent Application No. PCT/IB2017/050819, 13 pages.

Ken K., "Tutorial 1: Your first contract," Ethereum.org, Dec. 2014, https://web.archive.org/save/_embed/https://forum.ethereum.org/discussion/1634/tutorial-1-your-first-contract/p1, 22 pages.

Pour, "Bitcoin multisig the hard way: Understanding raw P2SH multisig transactions," Dec. 20, 2014, https://www.soroushjp.com/2014/12/20/bitcoin-multisig-the-hard-way-understanding-raw-multisignature-bitcoin-transactions/, 19 pages.

Swan, "Blockchain: Blueprint for a New Economy," O'Reilly, Feb. 2015, 149 pages.

UK Commercial Search Report dated Jun. 27, 2016, Patent Application No. GB1603125.4, 11 pages.

UK Commercial Search Report dated May 16, 2016, Patent Application No. GB1603125.4, 8 pages.

UK IPO Search Report dated Jul. 4, 2016, Patent Application No. GB1603125.4, 6 pages.

White, "How Computers Work," Que Publishing 7th Edition, Oct. 15, 2003, 44 pages.

\* cited by examiner

ALICE

| Offer: | BTC |
|---|---|
| Request: | Token |
| Offer-type-code | $0000_2$ |
| Offer-QTY-max | NULL |
| Offer-QTY-min | NULL |
| Offer-item-ID | |
| Rate-min | $4.00000000 \times 10^{-5}$ shares/satoshi |
| Rate-max | NULL (no maximum - i.e. infinity) |
| Request-type-code | $0001_2$ |
| Request-item-ID | CAD1234 |
| Request-QTY-max | 10000 shares |
| Request-QTY-min | NULL (no minimum - i.e. 0) |
| Offer-Deadline | midnight 31-Dec-2016 |
| Explanation of the order | I will buy tokenised CAD for BTC up to $1000 at a rate of no less than $400/BTC. Deadline is midnight 31-Dec-2016 |

Fig. 4

BOB

| Offer: | TOKEN |
|---|---|
| Request: | BTC |
| Offer-type-code | $0001_2$ |
| Offer-QTY-max | 15000 shares |
| Offer-QTY-min | NULL (no minimum - i.e. 0) |
| Offer-item-ID | CAD1234 |
| Rate-min | $2.43902439 \times 10^{2}$ satoshis/share |
| Rate-max | NULL (no maximum) |
| Request-type-code | $0000_2$ |
| Request-item-ID | |
| Request-QTY-max | NULL |
| Request-QTY-min | NULL |
| Offer-Deadline | NULL |
| Explanation of the order | I will sell tokenised CAD up to $1500 at a rate of no more than $410/BTC |

Fig. 5

| Alice sends BTC to Bob | |
|---|---|
| ALICE00040 | Trancaction-ID |
| Version number | Version number |
| 1 | Number of inputs |
| ALICE00010 | Prev Trans Output |
| IDX-00 | Prev Trans Output index |
| Script length | Script length |
| Sig-Alice Sig-EscrowA < OP_2 metadataA metadataB metadataC metadataD metadataE PubK-Alice PubK-EscrowA OP_7 OP_CHECKMULTSIG> | ScriptSig |
| Sequence number | Sequence number |
| 3 | Number of outputs |
| 246,913,580 satoshi | Output value |
| Output script length | Output script length |
| OP_DUP OP_HASH160 <PubK-Bob hash> OP_EQUALVERIFY OP_CHECKSIG | Output script |
| 2,469,136 satoshi | Output value |
| Output script length | Output script length |
| OP_DUP OP_HASH160 <PubK-Server hash> OP_EQUALVERIFY OP_CHECKSIG | Output script |
| 3,116,284 satoshi | Output value |
| Output script length | Output script length |
| OP_DUP OP_HASH160 <PubK-Alice hash> OP_EQUALVERIFY OP_CHECKSIG | Output script |
| LockTime | LockTime |

| Bob sends token to Alice | |
|---|---|
| BOB00030 | Trancaction-ID |
| Version number | Version number |
| 2 | Number of inputs |
| BOB00010 | Prev Trans Output |
| IDX-00 | Prev Trans Output index |
| Script length | Script length |
| Sig-Bob Sig-Issuer < 2 metadata1 metadata2 PubK-Bob PubK-Issuer 4 OP_CHECKMULTSIG> | ScriptSig |
| Sequence number | Sequence number |
| BOB00010 | Prev Trans Output |
| IDX-01 | Prev Trans Output index |
| Script length | Script length |
| Sig-Bob PubK-Bob | ScriptSig |
| Sequence number | Sequence number |
| 4 | Number of outputs |
| 10,000,000 satoshi | Output value |
| Output script length | Output script length |
| OP_HASH160 <redeem script hash>OP_EQUAL | Output script |
| 5,000,000 satoshi | Output value |
| Output script length | Output script length |
| OP_HASH160 <redeem script hash>OP_EQUAL | Output script |
| 10,000 satoshi | Output value |
| Output script length | Output script length |
| OP_DUP OP_HASH160 <PubK-Server hash> OP_EQUALVERIFY OP_CHECKSIG | Output script |
| 880,000 satoshi | Output value |
| Output script length | Output script length |
| OP_DUP OP_HASH160 <PubK-Bob hash> OP_EQUALVERIFY OP_CHECKSIG | Output script |
| LockTime | LockTime |

Fig. 7

| Alice sends BTC to Bob | |
|---|---|
| Transaction-ID | Trancaction-ID |
| Version number | Version number |
| 1 | Number of inputs |
| ALICE00010 | Prev Trans Output |
| IDX-00 | Prev Trans Output index |
| Script length | Script length |
| Sig-Alice PubK-Alice | ScriptSig |
| Sequence number | Sequence number |
| 3 | Prev Trans Output |
| 246,913,580 satoshi | Prev Trans Output index |
| Output script length | Script length |
| OP_DUP OP_HASH160 <PubK-Bob hash> OP_EQUALVERIFY OP_CHECKSIG | ScriptSig |
| 2,469,136 satoshi | Sequence number |
| Output script length | Number of outputs |
| OP_DUP OP_HASH160 <PubK-Server hash> OP_EQUALVERIFY OP_CHECKSIG | Output value |
| 50,616,284 satoshi | Output script length |
| Output script length | Output script |
| OP_DUP OP_HASH160 <PubK-Alice hash> OP_EQUALVERIFY OP_CHECKSIG | Output value |
| LockTime | Output script length |
| Bob sends token to Alice | |
| Transaction-ID | Trancaction-ID |
| Version number | Version number |
| 2 | Number of inputs |
| BOB00010 | Prev Trans Output |
| IDX-00 | Prev Trans Output index |
| Script length | Script length |
| Sig-Bob Sig-Issuer < 2 metadata1 metadata2 PubK-Bob PubK-Issuer 4 OP_CHECKMULTSIG> | ScriptSig |
| Sequence number | Sequence number |
| BOB00010 | Prev Trans Output |
| IDX-01 | Prev Trans Output index |
| Script length | Script length |
| Sig-Bob PubK-Bob | ScriptSig |
| Sequence number | Sequence number |
| 4 | Number of outputs |
| 10,000,000 satoshi | Output value |
| Output script length | Output script length |
| OP_HASH160 <redeem script hash>OP_EQUAL | Output script |
| 5,000,000 satoshi | Output value |
| Output script length | Output script length |
| OP_HASH160 <redeem script hash>OP_EQUAL | Output script |
| 10,000 satoshi | Output value |
| Output script length | Output script length |
| OP_DUP OP_HASH160 <PubK-Server hash> OP_EQUALVERIFY OP_CHECKSIG | Output script |
| 880,000 satoshi | Output value |
| Output script length | Output script length |
| OP_DUP OP_HASH160 <PubK-Bob hash> OP_EQUALVERIFY OP_CHECKSIG | Output script |
| LockTime | LockTime |

Fig. 9

| | |
|---|---|
| AB00010 | Trancaction-ID |
| Version number | Version number |
| 3 | Number of inputs |
| ALICE00010 | Prev Trans Output |
| IDX-00 | Prev Trans Output index |
| Script length | Script length |
| Sig-Alice PubK-Alice | ScriptSig |
| Sequence number | Sequence number |
| BOB00010 | Prev Trans Output |
| IDX-00 | Prev Trans Output index |
| Script length | Script length |
| Sig-Bob Sig-Issuer < 2 metadata1 metadata2 PubK-Bob PubK-Issuer 4 OP_CHECKMULTSIG> | ScriptSig |
| Sequence number | Sequence number |
| BOB00010 | Prev Trans Output |
| IDX-01 | Prev Trans Output index |
| Script length | Script length |
| Sig-Bob PubK-Bob | ScriptSig |
| Sequence number | Sequence number |
| 7 | Number of outputs |
| 246,913,580 satoshi | Output value |
| Output script length | Output script length |
| OP_DUP OP_HASH160 <PubK-Bob hash> OP_EQUALVERIFY OP_CHECKSIG | Output script |
| 2,469,136 satoshi | Output value |
| Output script length | Output script length |
| OP_DUP OP_HASH160 <PubK-Server hash> OP_EQUALVERIFY OP_CHECKSIG | Output script |
| 50,616,284 satoshi | Output value |
| Output script length | Output script length |
| OP_DUP OP_HASH160 <PubK-Alice hash> OP_EQUALVERIFY OP_CHECKSIG | Output script |
| 10,000,000 satoshi | Output value |
| Output script length | Output script length |
| OP_HASH160 <redeem script hash>OP_EQUAL | Output script |
| 5,000,000 satoshi | Output value |
| Output script length | Output script length |
| OP_HASH160 <redeem script hash>OP_EQUAL | Output script |
| 10,000 satoshi | Output value |
| Output script length | Output script length |
| OP_DUP OP_HASH160 <PubK-Server hash> OP_EQUALVERIFY OP_CHECKSIG | Output script |
| 880,000 satoshi | Output value |
| Output script length | Output script length |
| OP_DUP OP_HASH160 <PubK-Ali hash> OP_EQUALVERIFY OP_CHECKSIG | Output script |
| LockTime | LockTime |

Fig. 10

| | Bob |
|---|---|
| Offer | Gold Nugget |
| Request | BTC |
| Offer-type-code | $00001_2$ |
| Offer-QTY-max | 1 |
| Offer-QTY-min | 1 |
| Offer-item-ID | GN1234 |
| Rate-min | NULL (no minimum) |
| Rate-max | NULL (no maximum) |
| Request-type-code | $00000_2$ |
| Request-item-ID | |
| Request-QTY-max | NULL |
| Request-QTY-min | NULL |
| Condition | 0004 |
| Location Code | 0101 |
| Range Code | 01 |
| Range | 20 |
| Location | 52.600120, -1.349945 |
| Explanation of the offer | I am offering one gold nugget in exchange for Bitcoins at my store the Gold Emporium |

Fig. 12

| Field | Sub-field | Bytes | Value | Comments |
|---|---|---|---|---|
| MetadataX | ConditionCode | 2 | 0x0000 | Value indicates the condition as defined by a DHT of condition codes |
| | Data | 30 | | Format depends on the Specific Condition code |

Fig. 13

| Field | Sub-field | Bytes | Value | Comments |
|---|---|---|---|---|
| MetadataX | ConditionCode | 2 | 0x0004 | Value indicates LOCATION specific exchange |
| | LocationCode | 2 | 0x0101 | Example: Value indicates location is expressed as GPS coordinates |
| | RangeCode | 1 | 0x01 | Example: Value indicates range is in metres |
| | Range | 1 | 0x64 | Integer value expressed in binary. Example: 100 metres |
| | Location | 26 | | Location - expressed as required by the LocationCode |

Fig. 14

| | Alice |
|---|---|
| Offer | BTC |
| Request | Gold Nugget |
| Offer-type-code | $0000_2$ |
| Offer-QTY-max | 1 |
| Offer-QTY-min | 1 |
| Offer-item-ID | |
| Rate-min | $1.00 \times 10^2$ satoshi/gold nugget |
| Rate-max | NULL (no maximum) |
| Request-type-code | $0001_2$ |
| Request-item-ID | GN1234 |
| Request-QTY-max | 1 |
| Request-QTY-min | 1 |
| Explanation of the offer | I will buy one gold nugget in exchange for 100 BTC |

Fig. 15

| Alice sends token to Carol | |
|---|---|
| ALI00010 | Trancaction-ID |
| Version number | Version number |
| 2 | Number of inputs |
| ALI00010 | Prev Trans Output |
| IDX-00 | Prev Trans Output index |
| Script length | Script length |
| Sig-Ali Sig-Issuer < 2 metadata1 metadata2 PubK-Ali PubK-Issuer 4 OP_CHECKMULTSIG> | ScriptSig |
| Sequence number | Sequence number |
| ALI00010 | Prev Trans Output |
| IDX-01 | Prev Trans Output index |
| Script length | Script length |
| Sig-Ali PubK-Ali | ScriptSig |
| Sequence number | Sequence number |
| 4 | Number of outputs |
| 10,000,000 satoshi | Output value |
| Output script length | Output script length |
| OP_HASH160 <redeem script hash>OP_EQUAL | Output script |
| 5,000,000 satoshi | Output value |
| Output script length | Output script length |
| OP_HASH160 <redeem script hash>OP_EQUAL | Output script |
| 10,000 satoshi | Output value |
| Output script length | Output script length |
| OP_DUP OP_HASH160 <PubK-Server hash> OP_EQUALVERIFY OP_CHECKSIG | Output script |
| 880,000 satoshi | Output value |
| Output script length | Output script length |
| OP_DUP OP_HASH160 <PubK-Ali hash> OP_EQUALVERIFY OP_CHECKSIG | Output script |
| LockTime | LockTime |

Alice pays Carol $1000 in tokenised CAD (expecting her GBP from Bob at a rate of AUD$2/GBP)
Alice pays herself the remainder of tokenised CAD (i.e. change) = $1500-$1000
Using regular (untokenised BTC) Alice pays the Service Provider's fee (say, flat rate = 10000 sat)
Using regular (untokenised BTC) Alice pays herself change from 900,000 leaving 1000 for miner

Fig. 16A

| Bob sends token to Alice | |
|---|---|
| BOB00030 | Trancaction-ID |
| Version number | Version number |
| 2 | Number of inputs |
| BOB00010 | Prev Trans Output |
| IDX-00 | Prev Trans Output index |
| Script length | Script length |
| Sig-Bob Sig-Issuer < 2 metadata1 metadata2 PubK-Bob PubK-Issuer 4 OP_CHECKMULTSIG> | ScriptSig |
| Sequence number | Sequence number |
| BOB00010 | Prev Trans Output |
| IDX-01 | Prev Trans Output index |
| Script length | Script length |
| Sig-Bob PubK-Bob | ScriptSig |
| Sequence number | Sequence number |
| 4 | Number of outputs |
| 10,000,000 satoshi | Output value |
| Output script length | Output script length |
| OP_HASH160 <redeem script hash>OP_EQUAL | Output script |
| 5,000,000 satoshi | Output value |
| Output script length | Output script length |
| OP_HASH160 <redeem script hash>OP_EQUAL | Output script |
| 10,000 satoshi | Output value |
| Output script length | Output script length |
| OP_DUP OP_HASH160 <PubK-Server hash> OP_EQUALVERIFY OP_CHECKSIG | Output script |
| 880,000 satoshi | Output value |
| Output script length | Output script length |
| OP_DUP OP_HASH160 <PubK-Bob hash> OP_EQUALVERIFY OP_CHECKSIG | Output script |
| LockTime | LockTime |

Bob pays Alice GBP500 in tokenised GBP (expecting his AUD at a rate of $2/GBP)
Bob pays himself the remainder of tokenised GBP (i.e. change) = GBP750-GBP500
Using regular (untokenised BTC) Bob pays the Service Provider's fee (say, flat rate = 10000 sat)
Using regular (untokenised BTC) Bob pays himself change from 900,000 leaving 1000 for miner

Fig. 16B

| Carol sends token to Bob | |
|---|---|
| CAR00020 | Trancaction-ID |
| Version number | Version number |
| 2 | Number of inputs |
| CAR00010 | Prev Trans Output |
| IDX-00 | Prev Trans Output index |
| Script length | Script length |
| Sig-Car Sig-Issuer < 2 metadata1 metadata2 PubK-Car PubK-Issuer 4 OP_CHECKMULTSIG> | ScriptSig |
| Sequence number | Sequence number |
| CAR00010 | Prev Trans Output |
| IDX-01 | Prev Trans Output index |
| Script length | Script length |
| Sig-Car PubK-Car | ScriptSig |
| Sequence number | Sequence number |
| 4 | Number of outputs |
| 10,000,000 satoshi | Output value |
| Output script length | Output script length |
| OP_HASH160 <redeem script hash>OP_EQUAL | Output script |
| 5,000,000 satoshi | Output value |
| Output script length | Output script length |
| OP_HASH160 <redeem script hash>OP_EQUAL | Output script |
| 10,000 satoshi | Output value |
| Output script length | Output script length |
| OP_DUP OP_HASH160 <PubK-Server hash> OP_EQUALVERIFY OP_CHECKSIG | Output script |
| 880,000 satoshi | Output value |
| Output script length | Output script length |
| OP_DUP OP_HASH160 <PubK-Ali hash> OP_EQUALVERIFY OP_CHECKSIG | Output script |
| LockTime | LockTime |

Carol pays Bob $1000 in tokenised AUD (expecting her CAD at a rate of $1CAD/AUD)
Carol pays herself the remainder of tokenised AUD (i.e. change) = $1500-$1000
Using regular (untokenised BTC) Carol pays the Service Provider's fee (say, flat rate = 10000 sat)
Using regular (untokenised BTC) Carol pays herself change from 900,000 leaving 1000 for miner

Fig. 16C

METHOD AND SYSTEM FOR THE SECURE TRANSFER OF ENTITIES ON A BLOCKCHAIN

TECHNICAL FIELD

The present invention relates to distributed, peer-to-peer ledgers and, in particular, blockchain technologies. The invention also relates in part to tokenisation and security techniques, and secure mechanisms for transferring entities and/or ownership of entities via a blockchain. It may comprise a method of performing secure transactions between different parties over a blockchain.

BACKGROUND & INTRODUCTION TO THE TECHNICAL AREA

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing etc) while being more versatile in their applications.

One area of current research is the use of the blockchain for the implementation of "smart contracts". These are computer programs designed to automate the execution of the terms of a machine-readable contract or agreement. Unlike a traditional contract which would be written in natural language, a smart contract is a machine executable program which comprises rules that can process inputs in order to produce results, which can then cause actions to be performed dependent upon those results.

Another area of blockchain-related interest is the use of 'tokens' (or 'coloured coins') to represent and transfer real-world entities via the blockchain. A potentially sensitive or secret item can be represented by the token which has no discernable meaning or value. The token thus serves as an identifier that allows the real-world item to be referenced from the blockchain. Tokenisation techniques can be used in respect of many different types of contexts where security, anonymity and cross-platform compliance are important. One such application area is financial applications, although the present invention is not limited to use in relation to financial transactions.

In this document we use the term 'blockchain' to include all forms of electronic, computer-based, distributed ledgers. These include, but are not limited to consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

SUMMARY

The invention is defined in the appended claims.

The present invention may provide solutions for the secure control and/or transfer or exchange of an asset via a blockchain. Herein, the term "entity" may be used interchangeably with "asset". Additionally or alternatively, the invention may enable control and/or transfer of ownership of the asset. This may be a digital or virtual asset such as a smart contract, or a real-world/physical asset. The asset may be a right such as a license or right to use or some sort of right relating to some type of property. The invention may use tokenisation techniques to facilitate this control or transfer. The invention may enable the transfer/exchange to be performed in a secure manner, incorporating the use of cryptographic keys, while not requiring any alteration of the underlying blockchain protocol. The invention may use techniques for embedding metadata in a script associated with a blockchain transaction (Tx).

The invention provides, not least: enhanced optimisation of memory usage for electronic transfers, improved security and data integrity through the use of hashing techniques, improved security through the removal of a need for a trusted third party, and enhanced anonymity of data. It may also provide improved communication mechanisms to enable disparate or distinct parties to identify each other and/or exchange data via the novel methods and/or architectures provided by the invention. This list of advantages is not limiting or exhaustive.

The invention may require the interaction and intercommunication of various distinct and separate computer-based resources, such as one or more user devices and a distributed computer system (blockchain) which includes computing nodes arranged to execute blockchain-related software and protocols.

The invention may provide a computer implemented method of offering an exchange of an entity. The method may comprise:
  generating a first script, the first script comprising:
    a first set of metadata associated with a first invitation for the exchange of a first entity by a first user, the first set of metadata comprising an indication of the first entity to be offered for exchange and a first location condition for the exchange, a first user public key (P1A) associated with the first user, wherein the first user public key (P1A) is part of an asymmetric cryptographic pair comprising the first user public key (P1A) and a first user private key (V1A), hashing the first script to generate a first script hash; and publishing the first script and the first script hash on a distributed hash table (DHT).

The first script may comprise a first third-party public key (P1T) associated with a first third-party, wherein the first third-party public key (P1T) is part of an asymmetric cryptographic pair comprising the first third-party public key (P1T) and a first third-party private key (V1T).

The first script may be a script associated with a blockchain transaction (Tx). It may be a redeem script.

The method may further comprise generating a first invitation transaction (Tx) for inclusion on a peer-to-peer (P2P) distributed ledger (i.e. blockchain), the first invitation transaction comprising an indication of a second entity to be transferred in exchange for the first entity, and the first script hash.

The P2P distributed ledger may be the Bitcoin block chain. However, it will be appreciated that any other suitable P2P distributed ledger is envisaged.

Thus, the hash of the (redeem) script may be provided within, or associated with, a blockchain transaction (Tx). This may be a P2SH transaction in accordance with the Bitcoin protocol, or another functionally equivalent transaction type in another blockchain protocol. The hash of the script may serve as a look-up key to a hash table or other storage resource. This storage resource may be a public domain repository of invitations. The storage resource may comprise the look-up key (ie the hash) and all the fields from the metadata which, in combination, define the invitation. The look-up key may be a hash of the rest of the record i.e. a hash of the concatenated metadata values. In a preferred embodiment, the metadata may comprise a pointer or other reference to the location of a contract associated with a token. The contract may be stored in a separate storage resource. The invitation (as defined by the metadata in the storage resource) may be linked to the blockchain transaction via the hash.

A number of advantages are provided by the invention, some of which are now described. Firstly, because information regarding the exchange is included in metadata securely embedded in a distributed ledger, the exchange can be carried out securely on a peer-to-peer basis, thereby making a trusted third party unnecessary. This in turn avoids the need for a large amount of sensitive information about both parties to the exchange to be held by any third party such as a service provider, which in turn avoids the risks associated with that third party's security being compromised. This advantage is provided while also preserving anonymity of the transactions. Since the first script is hashed, it would be impracticably difficult to change the values of the metadata without causing a change in the corresponding hash values of the script. This also enables the terms of the transaction to be verified by the parties, since they are locked on a publicly available distributed ledger, which enables the integrity of the transactions to be trusted. The advantage is also provided that the first metadata can be embedded in one or more of the places available for public keys in the first script, thereby enabling nodes not suitable for processing the metadata to simply transmit the script to a further node, as opposed to blocking its progress. This in turn improves computational efficiency of the related transactions. A further advantage is provided that control data can be incorporated into the metadata, for example an access code for a barrier in the case of a token representing a ticket for a venue or a travel ticket or voucher. The metadata may also contain a pointed to an off-block repository of the details of the exchange, thereby enabling less memory and/or processing resources to be used in processing the related transactions. A yet further advantage is provided that the token can be divided, enabling two or more transaction outputs, each of which can relate to tokenised or untokenised electronically transferrable digital asset.

The first entity that is offered for exchange and/or the second entity to be transferred in exchange for the first entity may comprise one or more of the following:

a) a cryptocurrency;
b) a contract;
c) goods;
d) services.

The contract may be related, at least in part, to one or more of the following:

a) a fiat currency;
b) title deeds;
c) goods;
d) services.

The first location condition may comprise one or more of the following:

a) location information indicative of a geographical location or area for the exchange of the first entity;
b) location format information indicative of a format of the location information;
c) range information indicative of a range limit on the geographical location or area relating to the exchange; and
d) range format information indicative of a format of the range information.

The method may comprise a step of:

matching the first invitation of the first script to a second script that is published on the DHT by comparing at least the first entity specified in the first script with a second entity specified in the second script, wherein the second script comprises a second set of metadata associated with a second invitation for an exchange of a second entity by a second user, the second set of metadata comprising an indication of the second entity to be offered in exchange for the first entity, a second user public key (P2A) associated with the second user, wherein the second user public key (P2A) is part of an asymmetric cryptographic pair comprising the second user public key (P2A) and a second user private key (V2A), and a second third-party public key (P2T) associated with a second third-party, wherein the second third-party public key (P2T) is part of an asymmetric cryptographic pair comprising the second third-party public key (P2T) and a second third-party private key (V2T).

The method may comprise a step of determining whether the location condition is fulfilled by identifying a location of the first user and/or the second user.

The second third party may be the same as the first third party.

The method may further comprise a step of publishing the second script on the DHT, comprising:

generating the second script:

hashing the second script to generate a second script hash; and publishing the second script and the second script hash on the DHT.

The method may comprise a step of generating a second transaction invitation for inclusion on the P2P distributed ledger, the second invitation transaction comprising an indication of the first entity to be transferred in exchange for the second entity; and the second script hash.

In one example, the method may further comprise:
generating a first exchange transaction for inclusion on the P2P distributed ledger, the first exchange transaction comprising:
the first script,
the first user public key (P1A),
the first third-party public key (P1T),
a first input provided from an output of the first invitation transaction, and
a first output indicating a first quantity of a first entity to be transferred to the second user; and
recording the first exchange transaction on the P2P distributed ledger.

Further, the method may comprise:
generating a second exchange transaction for inclusion on the P2P distributed ledger, the second exchange transaction comprising:
the second script,
the second user public key (P2A),
the second third-party public key (P2T),
a second input provided from an output of the second invitation transaction, and
a second output indicating a second quantity of a second entity to be transferred to the first user; and
recording the second exchange transaction on the P2P distributed ledger.

Alternatively, the method may comprise:
generating a first exchange transaction for inclusion on the P2P distributed ledger, the first exchange transaction comprising:
the first script,
the first user public key (P1A),
the first third-party public key (P1T),
the second script,
the second user public key (P2A),
the second third-party public key (P2T)
a first input provided from an output of the first invitation transaction,
a second input provided from an output of the second invitation transaction,
a first output indicating a first quantity of a first entity to be transferred to the second user, and
a second output indicating a second quantity of a second entity to be transferred to the first user; and
recording the first exchange transaction on the P2P distributed ledger.

The step of generating the first exchange transaction may comprise facilitating signing of the first script with the first user private key (V1A); and facilitating signing of the first script with the first third-party private key (P1T).

Similarly, the step of generating the second exchange transaction may comprise facilitating signing of the second script with the second user private key (V1A); and facilitating signing of the second script the second third-party private key (P2T).

The method may further comprise facilitating one or more of the first and second users to accept the exchange before generating or recording the first and/or second exchange transactions.

One or more of the first exchange transaction, and the second transaction may be a pay-to-script-hash (P2SH) transaction.

In accordance with embodiments of the present disclosure, there is provided a computer system for offering an exchange of an entity, the computer system comprising:
a first processing device configured to:
generate a first script comprising:
a first set of metadata associated with a first invitation for the exchange of a first entity by a first user, the first set of metadata comprising an indication of the first entity to be offered for exchange and a first location condition for the exchange,
a first user public key (P1A) associated with the first user, wherein the first user public key (P1A) is part of an asymmetric cryptographic pair comprising the first user public key (P1A) and a first user private key (V1A),
hash the first script to generate a first script hash; and
publish the first script and the first script hash on a distributed hash table (DHT).

The script may also comprise a first third-party public key (P1T) associated with a first third-party, wherein the first third-party public key (P1T) is part of an asymmetric cryptographic pair comprising the first third-party public key (P1T) and a first third-party private key (V1T);

Embodiments of the present disclosure further relate to a processor or group of processors operable to perform the above described method.

Embodiments of the present disclosure also relate to a computer readable medium having stored thereon instructions which, when executed, are operable to perform the above described method.

Embodiment(s) of the invention may comprise a technique for embedding metadata in a (blockchain) transaction, comprising the steps of:
generating a blockchain transaction (Tx) having an output (TxO) related to an asset (B1) and a hash of a redeem script which comprises:
metadata comprising a token which is a representation of, or a reference to, a tokenised entity;
and
at least one (preferably two or more) public cryptographic keys.

The digital asset (B1) may be a quantity of cryptocurrency eg Bitcoin. The redeem script may be provided within a locking script of the transaction output TxO. The metadata may be provided in the redeem script at a location which is designated in a blockchain protocol as a location for a cryptographic key. This provides the advantage that the metadata can be transferred without the need for any alteration to the underlying blockchain protocol. Nodes operating the protocol will be agnostic to the use of the metadata in place of the cryptographic key.

The method may further include the step of submitting the transaction Tx to a blockchain. In effect, the cryptocurrency (B1) may thus be locked on the blockchain in association with the token. The quantity of cryptocurrency (B1) can only be spent (redeemed) upon provision of an unlocking script which meets the requirements of the locking script for the output TxO. In particular, a redeem script must be presented which, when hashed, matches the hash provided in the locking script of TxO. As the locking script for output TxO comprises the hash of the redeem script which in turn includes the token (in the metadata), the cryptocurrency (B1) is associated with the token. Upon presentation of the correct unlocking (redeem) script, ownership of the cryptocurrency (B1) may be transferred to the redeeming party or user i.e. it is spent.

Any feature(s) mentioned above in relation to one aspect or embodiment may be used in relation to any other embodiment or aspect. Any feature mentioned in relation to a method of the invention may apply equally to a corresponding, implanting system and vice versa.

BRIEF DESCRIPTION OF DRAWINGS

Embodiments of the present disclosure will now be described, by non-limiting example only, with reference to the accompanying drawings, in which:

FIG. 4 is a table illustrating a metadata format for an invitation generated by an exchange service provider;

FIG. 5 is a table illustrating a metadata format for an invitation generated by an exchange service provider;

FIG. 7 is a transaction table for a plurality of transactions between a plurality of parties to the system of FIG. 1;

FIG. 9 is a transaction table for a plurality of transactions between a plurality of parties to the system of FIG. 1;

FIG. 10 is a transaction table for a plurality of transactions between a plurality of parties to the system of FIG. 1;

FIGS. 12 to 15 show tables illustrating metadata formats for an invitation generated by an exchange service provider;

FIG. 16A is a transaction table for a transaction between two parties to the system of FIG. 1;

FIG. 16B is a transaction table for a transaction between two parties to the system of FIG. 1; and FIG. 16C is a transaction table for a transaction between two parties to the system of FIG. 1.

DESCRIPTION OF EMBODIMENTS

Figure 1:
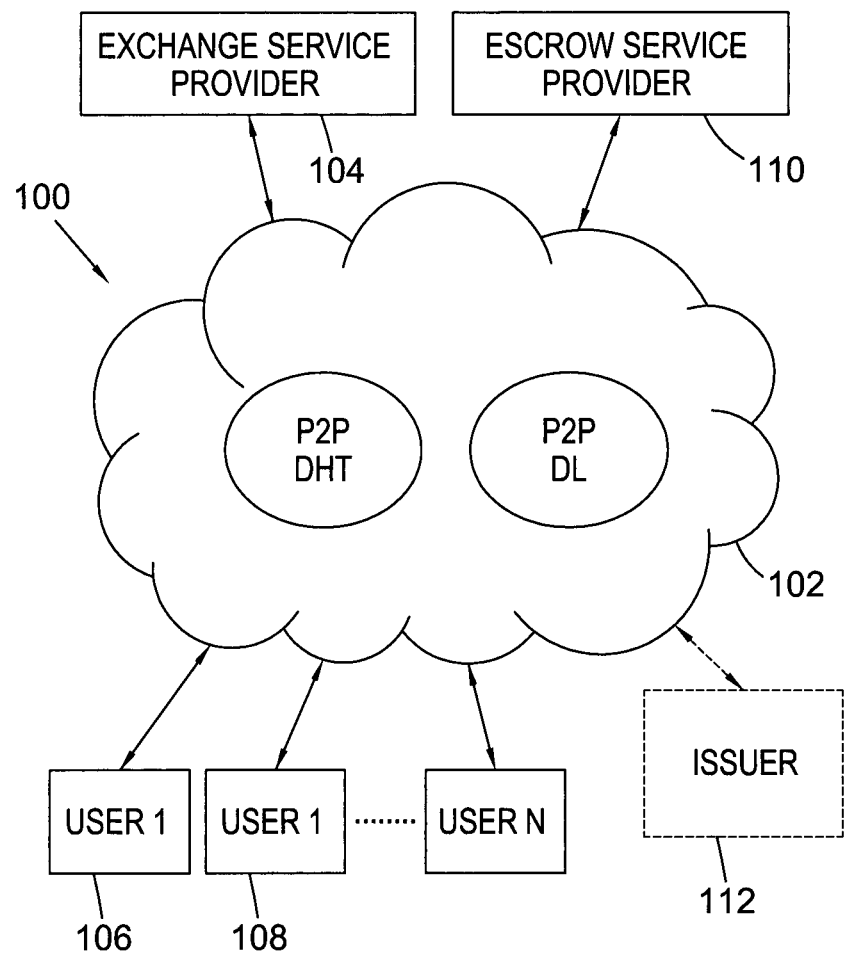
FIG. 1 is a schematic diagram of a system according to an embodiment of the present disclosure.

State of the art methods of performing common financial transactions, such as a payment into another person's bank account or a foreign currency exchange, incur cost in both transaction fees and time delay. In contrast, transactions in electronic currencies such as bitcoin can be processed at a much faster rate (i.e. minutes rather than days) and for far less cost (in the order of a few cents per transaction rather than tens of dollars).

There exists a need for a quicker and cheaper way of performing and keeping a permanent record of day-to-day transactions, both financial and non-financial. It is important to note, that the invention is not limited to use with, or advantages for, financial applications. Instead, the present disclosure generally relates to a computer implemented method and a computer system for utilising a P2P distributed ledger, such as the Bitcoin blockchain, to enable parties to offer an exchange of an entity and record the exchange of the entity which may be any type of entity of value. Exemplary methods described herein relate to the generation of a script indicative of an invitation or offer to perform an exchange of an entity. Further methods described herein relate to the enactment of the actual exchange of the entity upon matching the script to another script.

By utilising the P2P distributed ledger, such as the Bitcoin blockchain, embodiments of the present disclosure provide for a permanent record of all steps of an exchange process to be maintained. Further, each stage in the process (offer and exchange) can be secured using cryptographic locking techniques similar to those used in transactions of cryptocurrencies. By "cryptocurrency" is meant an encrypted, electronically transferrable digital asset such as, but not limited to, Bitcoin.

The exemplary methods described herein can be used to offer and exchange any type of entity. Examples of such entities include but are not limited to cryptocurrency, such as Bitcoins, fiat currencies, contracts, goods and services.

Exchanges such as Coinffeine (http://www.coinffeine.com/) which involve the use of blockchain technologies are known in the art. However, such prior art arrangements still rely on traditional models, and also rely on third-party sources, escrows, and other multi-currency non-bank accounts/processors in order to operate. These known arrangements achieve their decentralisation through their business models, rather than through technical innovations and cryptographic techniques (as per the present invention).

The present invention incorporates the use of tokenisation techniques. Contracts may be offered for exchange or exchanged by virtue of tokens.

In summary, a token is an exchangeable entity represented by/representative of a contract. The contract may take one of several forms. For example, the contract may confer a right upon the holder or denote ownership of property. The value of the token may be contractually specified and is linked to the underlying BTC amount via a 'pegging rate'. The token is exchangeable via a transaction using a cryptocurrency protocol such as the Bitcoin protocol. The Bitcoin value on the transaction acts as a token representing a rights contract in digital form. The contract itself may be stored on the transaction or may be kept in a publicly accessible location, or may be held privately by the parties to the contract depending on the particular embodiment. Where the contract is not stored on the transaction, the transaction may store a unique pointer to the contract.

Tokens may be divisible. A divisible token is one in which the value on the transaction output can be subdivided into smaller amounts which can be allocated across multiple new tokens. Examples of divisible tokens include tokens for fiat currency or for shares in a race horse. Divisible contracts may be defined as those that specify a non-zero pegging rate. In other words, the token value is tied to the underlying bitcoin value. Alternatively, tokens may be non-divisible. A non-divisible token is a contract that specifies the holder's rights in terms of a fixed value, e.g. a contract to redeem a house or £1,000. Non-divisible tokens are therefore not linked to the value of the underlying Bitcoin.

Tokens must be digitally signed by a token issuer to be valid. The issuer may, for example, be an authority such as a Registrar of Title deeds. The issuer may issue a token to a user in return for payment. That token may then give the user the right to exercise the contract linked to the token, whether the contract represents the right to redeem fiat currency or for a service to be performed.

Examples of tokens in accordance with the above, include the following:

A fiat currency token that is pegged to the BTC value of the transaction output by the issuer of the contract. For example "the spender of this token (bitcoin transaction)

is entitled to redeem any fraction of this token for Canadian dollars (CAD) at a rate of 1 share (10 cents) for every 1000 satoshis".

A race horse owned by several members of a syndicate.

Any item where the ownership is by a title deed, e.g., a house or other property could be treated in this way.

An electronic contract representing a concert ticket. This is inherently non-divisible.

A bearer bond (non-divisible)

A unique identifier attached to a goods/service (such as a bar code or RFID). If used, this identifier is still preferably validated by a signature of an authorised entity; without a signature it will fall into the less secure 'goods/service' category (described below).

A contract for the right to a service to be performed. It is noted that this is not the same as the actual service itself, but only the right to have the service performed. This right can be traded. For example, a voucher from Michael's Mowing for up to 3 hours lawn mowing within the Sydney metropolitan area. The holder of this voucher (contract) can redeem it for the actual service.

Tokens must specify the value of a share, e.g., 1 share=10 cents CAD, 1 share=1 rupiah, or 1 share=1% ownership of an item or property (race horse, house, etc.).

Whilst embodiments described below may refer specifically to recording transactions on the Bitcoin blockchain, it will be understood that the present disclosure may be implemented using any P2P distributed ledger. The blockchain is used below to describe examples of the present disclosure for simplicity only due to its high level of standardisation and large quantity of associated public documentation.

As is well known in the art, the Bitcoin blockchain is a transaction ledger or database which is distributed across networked nodes participating in a system based on the Bitcoin protocol. A full copy of a currency's block chain contains every transaction ever executed in the currency. Thus, a continuously growing list of transactional data records is provided. Since each transaction entered onto the block chain is cryptographically enforced, the Bitcoin blockchain is hardened against tampering and revision, even by operators of the data store nodes.

In embodiments of the present disclosure, instead of or in addition to being used in its designed function of storing a record of transactions representing payments of Bitcoins (or other cryptocurrency) from one party to another, the blockchain is used in a novel manner to enable a transfer of entities or assets between parties. The exchange transfers control and/or ownership of the digital entity from one party to another. In order to achieve this, the invention provides a mechanism for holding and recording invitations (or orders) to perform an exchange of one or more entities. The invention thus provides a novel and advantageous communication solution which is conducted via the blockchain.

As mentioned above, any type of entity or asset is exchangeable. These may be physical, "real world" entities, or virtual, digital entities. Examples of entities which may be exchanged include cryptocurrencies such as Bitcoins, tokens (representing any type of transferrable contract), and goods and services of any type. Tokens may represent a contract conferring specified rights upon the holder to be redeemed for fiat currency (virtual banknotes), to denote ownership of property (e.g., title deeds), or grant access to an event (tickets), to name a few of many examples. Goods and services may include new or second hand products, labour (e.g., charged by the hour), complete jobs (e.g., mowing the lawn), to name a few of many examples.

FIG. 1 is a network diagram of a P2P exchange system 100 according to one embodiment. The system 100 comprises a network 102 and a plurality of parties to the network. The parties include an exchange service provider 104, a first user 106, a second user 108, an escrow service provider 110, and an issuer 112. As will be described in more detail below, a combination of functions of the exchange service provider 104, the escrow service provider 110 and the issuer 112, may be undertaken by a single party. In other words, a single party could simultaneously perform the functions of each. In addition, and as will be explained in more detail below, the exchange service provided 104 and escrow service provider 110 are optional, since the invention can be carried out entirely on the P2P exchange system without the use of those service providers 104, 110.

The exchange service provider 104 provides exchange services to a plurality of users, including the first user 106 and the second user 108. The issuer 112 is optional to the network 102, as denoted by broken lines. As will be discussed in more detail below, the issuer 112 may only be required when an exchange of tokens is required.

In some embodiments, the network 102 is the Internet. Accordingly, other parties (not shown) may be party to the network 102. All parties to the network 102 are able to communicate with all other parties to the network 102. Hosted on the network 102 are a peer-to-peer distributed hash table (P2P DHT) and a peer-to-peer distributed ledger (P2P DL). It will be appreciated that some or all of the parties shown in the system 100, together with those not shown, may act as host nodes to both or either of the P2P DHT and the P2P DL.

Structure of an Invitation

An invitation may be structured include various parameters or codes. These can be used for various purposes, eg matching invitations as described in more detail below. In one or more embodiments, the following structure may be used:

| | |
|---|---|
| Offer-type-code | |
| Offer-QTY-max | This is the amount of value e.g BTC that will be carried on the offerer's payment transaction. |
| | If the offerer is offering BTC than this value is simply the offerer's maximum BTC offer. |
| | If the offerer is offering tokenised currency then this value is the equivalent token value of the offerer's maximum offered currency amount (calculated based on the pegging rate specified on the tokenisation contract). The same is true if the offeror is offering a tokenised other commodity such as part ownership of a racehorse (the contract will still have a pegging rate that specifies the BTC token value for shares in the horse). |
| | If the offeror is offering a physical item then this field is ignored - but the actual bitcoin transaction will carry the minimum required amount (i.e. dust = 546 satoshis). |

| | |
|---|---|
| | Of course, the amount of the spend cannot exceed the total BTC value of the transaction's inputs so the offerer cannot offer more than the bitcoins owned. |
| Offer-QTY-min | |
| Offer-Item-ID | |
| Offer-Description | Keywords: This is a Condition that must be set if the Offer is goods/service and there is no other identifier (such as an auction site catalogue number) |
| Rate-min | This is the minimum rate of exchange that the offeror will accept expressed by convention as (requested units)/(offered units)<br>Examples:<br>(1) BTC offered for shares in a commodity (such as part ownership of a racehorse)<br>rate = shares/satoshis<br>(Note: this also applies to tokens that are non-divisible such as a concert ticket, although in this case there is only one share)<br>(2) Token share offered for BTC<br>rate = satoshis/share (e.g. satoshis/cent, where the tokens are for fiat amount such as CAD)<br>(3) Token for token<br>rate = requested-share/offered-share (e.g. cents/rupiah, where token offered represents rupiah and requested is CAD)<br>Note that this is only a convention for the sake of consistency and convenience and will make matching easier. The rate could be just as easily be converted into requested-satoshis/offered-satoshis based on the pegging rate used on the tokenisation contract. |
| Rate-max | |
| Conditions | This will be a code to indicate up to 8 conditions that will be coded in separate metadata fields. For example:<br>Deadline (in Unix time)<br>Location (described in more detail below)<br>The format of these metadata fields depends on the type of condition.<br>Note that Offer-Description and Request-Description are also considered conditions. They are usually not needed as all the information required normally be can be coded into the other metadata fields. If they are needed then they need to be flagged as existing by switch on the appropriate flags in the Conditions bitfield. |
| Request-type-code | |
| Request-item-ID | |
| Request-description | Keywords: This is a Condition that must be set if the Request is goods/service and there is no other identifier (such as an auction site catalogue number) |
| Request-QTY-max | |
| Request-QTY-min | |

One purpose of the exchange service provider 104 is to provide a gateway for users 106, 108 to place invitations or offers for an exchange of an entity on the P2P DHT and/or the P2P DL. Whilst the users 106, 108 of the network 102 may themselves place invitations on the P2P DHT and/or the P2P DL, the exchange service provider 104 provides an interface with which invitations are generated. Furthermore, the exchange service provider 104 may reduce the dangers associated with direct handling of transactions on a distributed ledger, such as the Bitcoin blockchain (e.g., losing transactions etc.) as the skilled person will appreciate. In addition to enabling the publishing of user invitations on the P2P DHT and/or P2P DL, the exchange service provider may perform one or more of the following additional services:

Matching invitations—As described above, an invitation may include a) details of the entities a user wishes to exchange, and b) one or more user applied options/conditions, such as a location condition, attached to the exchange. Two invitations may match when their respective entity details are mirrored and one or more of the conditions of the two invitations are compatible. In other words, a match may occur when one or more parameters or features included in a first invitation is/are also included in a second invitation. The is some commonality between one or more of the features of the invitations. An example of mirrored entity details would be when a first user (Alice) offers Bitcoins for apples and a second user (Bob) offers apples for Bitcoins. The service provider may therefore provide a matching service to match compatible invitations in order to accommodate an exchange. Matching may involve scanning the P2P DHT for one or more invitations having matching entities and/or conditions. In some embodiments, the service provider 104 may scan the P2P DHT in response to a request from a user. For example, a user may provide to the service provider 104 one or more criteria for a desired invitation. Based on the criteria provided, the service provider 104 may then search for invitations already placed on the P2P DHT which match those criteria. In other embodiments, the service provider 104 may implement a non-specific pairing algorithm which searches the P2P DHT for matching or near-matching invitations which do not relate to a specific user request. It will be appreciated that matching services may be provided by other third-party providers. One or more third-party providers may exist, whose primary purpose is to provide matching services in accordance with the above as well as match alerts as described below. In some embodiments, matching is provided by a matching service provider (MSP).

In accordance with one or more embodiments, and with reference to the table shown in the "Structure of an Invitation" section above, a matching algorithm from matching invitations between A and B such as the following may be employed:

A's Offer-type-code must match B's Request-type-code

A's Request-type-code must match B's Offer-type-code

A's Rate-Min≤B's Rate-max (when expressed in equivalent units)

A's Rate-Max≥B's Rate-min (when expressed in equivalent units)

Request-item-ID must match Offer-item-ID

A's Request-QTY-min≤B's Offer-QTY-max

A's Request-QTY-max≥B's Offer-QTY-min

A's condition(s) (if any) must be compatible with B's invitation

B's condition(s) (if any) must be compatible with A's invitation

The invention may be arranged to incorporate machine-executable rules which enforce this algorithm or a variation thereof Match alerts—If a match or near-match is detected, the exchange service provider 104 may alert a user in a known manner, such as by email or via a phone or tablet app. Thus, the invention may provide a novel communication or alert mechanism.

Generating new invitations based on matches—Where a user provides details of an invitation or offer the user wishes to place, the service provider 104 may scan the P2P DHT for one or more invitations which satisfy the conditions of the user's order. If a matching invitation is then found on the P2P DHT, the service provider 104 may generate an invitation which mirrors the identified invitation already on the P2P DHT in order to facilitate a successful match. It is noted that in order to complete the final transaction on the P2P DL, all parties to a transaction must have an invitation already published on the P2P DHT. However, not all invitations need be published on the P2P DHT. In the present example, for instance, the service provider need not publish the offer on the P2P DHT since there is no requirement for the invitation to be advertised as a desired match has already been found. It will be appreciated, however, that the generated invitation may still be placed on the P2P DHT, for example, in case the initial match falls through.

Executing transactions—After a pair of invitations have been successfully matched, the service provider 104 may act as a proxy to implement the final transaction. For example, on determination that two invitations provide an exact or near match, the service provider 104 may record an actual transaction, i.e. a transaction involving an exchange of the entity, on the P2P distributed ledger. This process may be conducted automatically without the parties express authorisation or after prompting one or more of the parties to authorise the transaction. In some embodiments, metadata in an invitation may indicate whether or not a party must be notified before an exchange is finalised.

Verifying fulfilment of conditions—where an invitation includes a condition, such as a location condition, the exchange service provider 104 may determine whether the condition is being fulfilled before finalising the exchange. With regard to the location condition, the exchange service provider 104 may, for example, determine the current location of a user when two invitations have been matched.

eWallet services—In addition to the above, the service provider 104 may also provide conventional eWallet services such as the holding of cryptocurrency keys etc.

A single service provider 104 is shown in the system 100 of FIG. 1. However, it will be appreciated that one or more additional exchange service providers may be part of the network 102. Where more than one exchange service provider exist, users may choose an exchange service provider depending on their requirements, which may, for example, include the service provider's fee structure, location, compatibility etc. It will therefore be appreciated that, in certain circumstances, two users with matching invitations may use different exchange service providers. In such circumstances, the users' respective exchange service providers may communicate with each other in order to facilitate matching of invitations and/or an exchange of an entity.

In addition to the exchange service providers 104, an escrow service provider 110 may be part of the network 104. The escrow service provider 110 enables a user's offer to be held (i.e. the amount offered is reserved) until a transaction is settled, or under certain conditions to cancel an order and have returned anything that was offered in an invitation. The escrow service provider 110 acts as a neutral third party, trusted by two parties of a transaction, to provide an escrow service for transactions. Thus, the system allows users participating in a final transaction to have a guarantee that the user making an offer can fulfil the offered amount (in Bitcoins or tokens).

As with exchange service provider, more than one escrow service provider may be part of the network 104. Users of the P2P exchange system 100 may also choose which escrow service provider they use, if and when they use one. In some embodiments, the services of the escrow service provider 110 may be incorporated into those of the exchange service provider 104 or vice versa. In such case, a separate escrow service provider may not be required.

In addition to the above, the system 100 may also comprise an issuer 112. An issuer 112 may be involved where the transaction involves the exchange of a token. In such circumstances, the process involves the issuer signing the token. Every transaction involving the transfer of a token may involve the issuer 112. In embodiments described herein, the issuer's signature is required in the invitation transaction, in which the token is offered and held in escrow. The issuer's signature may also be required in the exchange transaction, in which the payment of the token is made to the counterparty.

An aspect of embodiments of the present disclosure is the ability to embed metadata concerning an invitation or offer to perform an exchange of an entity in a Bitcoin transaction (or other cryptocurrency transaction) as well as the ability to embed metadata concerning an actual exchange of the entity, in a Bitcoin or other cryptocurrency transaction. Embodiments described herein use multi-signature pay to script hash (P2SH) type transactions to enable such metadata embedding as described below.

(i) Redeem Script in P2SH in General

As background, in a standard pay-to-script-hash method of the bitcoin protocol, the redeem script may take the form of:

<NumSigs PubK1 PubK2 PubK15 NumKeys OP_CHECKMULTISIG> where

NumSigs—is the number "m" of valid signatures required to satisfy the redeem script to unlock the transaction PubK1, PubK2 . . . PubK15—are the public keys that correspond to signatures that unlock the transaction (up to a maximum of 15 public keys)

NumKeys—is the number "n" of public keys (which must be 15 or less)

To redeem the above redeem script, at least a number "m" of signatures corresponding to the public keys are required.

In some examples, the order of the public keys is important and the number "m" out of "n" signatures for signing must be done in sequence. For example, say that "m" is two and the number of public keys "n" is fifteen. Say that two signatures are available for use, say Sig1 (corresponding to PubK1) and Sig 15 (corresponding to PubK15), the redeem script must be signed by Sig1 first followed by Sig15.

(ii) Embedding Metadata in a P2SH

Metadata may be embedded in a P2SH in one or more of the 15 places available for the public keys in the redeem script.

For example, the P2SH may take the form of:
<NumSigs Metadata1 Metadata2 . . . PubK1 PubK2 . . . NumKeys OP_CHECKMULTISIG>
where
- NumSigs—is the number "m" of valid signatures required to satisfy the redeem script to unlock the transaction,
- Metadata1 and Metadata2—each include metadata that takes place of a public key,
- PubK1 and PubK2—are actual public keys, and
- NumKeys—is the total number of positions taken by the metadata and the public keys (which must be 15 or less).

By placing, in a redeem script, metadata corresponding to conditions of an invitation, details of a contract associated with a token, and/or other information associated with an exchange, the hash of such information will be included in the P2P distributed ledger.

This embedding method can be summarised as:
generating a blockchain transaction (Tx) having an output (TxO) related to a portion of cryptocurrency and a hash of a redeem script which comprises:
  metadata comprising a token which is a representation of, or a reference to, a tokenised entity; and
  at least one (preferably two or more) public cryptographic keys.

The tokenised entity could be a contract and/or other entity relating to the exchange. The metadata is provided in a location designated by the protocol for a cryptographic key.

Thus, the use of multi-signature P2SH bitcoin transactions in embodiments of the present disclosure offers several advantages. Firstly, it enables an invitation transaction to carry a metadata payload. Secondly, it facilitates the use of escrow services in an exchange transaction. Thirdly, where tokens are transferred in an exchange, it allows an exchange transaction to carry metadata associated with the one or more tokens being exchanged. Also, the underlying blockchain protocol is agnostic to the fact that metadata is being transmitted via the transaction. Therefore, no change is required to the blockchain protocol to convey this information.

Metadata may include a description or keyword describing an offer or request in an invitation transaction. Metadata may also include conditions associated with the invitation. For example, a location condition may be attached to the invitation which may specify a geographical location at which the exchange of the entity must take place. In addition to the location condition, a deadline condition may further be attached to the invitation. In this regard, a cancellation transaction may be generated which spends the same Bitcoin amount and contains a locktime representing the deadline for the exchange to take place. The cancellation transaction may be prevented from being distributed on the P2P DL until the locktime. If the exchange does not take place by the deadline, the cancellation transaction is added to the P2P DL and effectively pays back the payer and or service provider.

If the exchange takes place before expiry of the deadline at the specified geographical location, the exchange transaction may spend the amount, creating a double-spend that hits the P2P DL ahead of the time-locked cancellation transaction, thereby blocking the cancellation transaction. In some embodiments, the metadata may not include a deadline, but instead the cancellation transaction can be solely responsible for cancelling the original invitation transaction. Alternatively, the deadline metadata condition may not automatically cause the spending of a cancellation transaction. In other words, the deadline may be a soft deadline which remains at the payer's control. This deadline may, therefore, be extended by a party simply allowing it to lapse and still accept late matching invitations. Equally, a service provider may still attempt to match an expired order if it remains unspent.

Instead of locking in the cancellation transaction at the same time as placing the invitation transaction, a user may wait until after the deadline and manually enter the cancellation transaction if and when the user wishes.

As mentioned above, a condition may include one or more location conditions which specify, for example, that an exchange transaction is only broadcast onto the P2P DHT if the location of the transactional broadcast is within X metres of specified GPS coordinates. This ensures that the transaction can only take place at a specified location, for example, Bob's coffee shop. This is described in more detail below A facility may exist that enables users to create their own new conditions and add them to the list of conditions by allocating them a previously unused condition-code. This facility may be resistant to abuse. For example, each service provider may simply make public their own table of conditions along with an associated condition-code and other parties to the system 100 can choose to adopt the same coding and may also add new ones of their own. Then if disputes arise due to, for example, re-use of condition code, the disputes may be resolved by the service provider or other users of the system 100.

Some examples of implementation of the present disclosure will now be described by way of example offers and transactions between the first user 106 (referred to herein as Alice) and the second user (referred to herein as Bob).

Posting an Invitation

Figure 2:
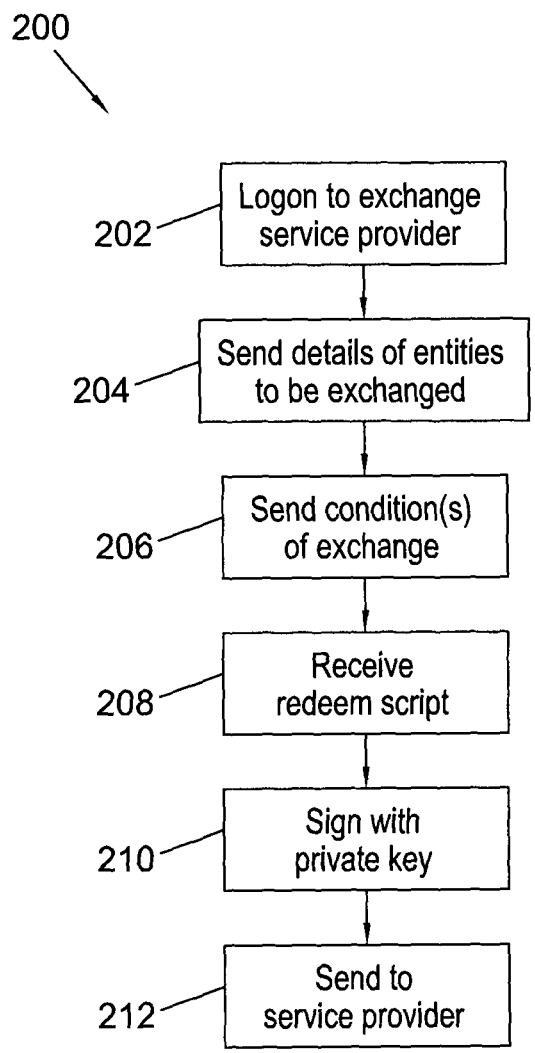
FIG. 2 is a flow diagram of a process performed by a user of the system of FIG. 1.

In a first example, Alice wants to buy some tokenised Canadian dollars (CAD) in exchange for Bitcoins. To advertise her interest, Alice contacts her exchange service provider 104 through, for example, a web interface or via an app running on a tablet or cell phone. As shown in FIG. 2, at step 202, Alice logs into the service provider's 104 web interface. At steps 204 and 206, Alice then sends details of her invitation, including entities to be exchanged (tokenised CAD for bitcoin) and conditions of the exchange and any selected options offered by the service provider, to the service provider. Alice may input this information into an interface hosted by the service provider 104, for example, using normal language which can then be translated by the service provider 104 into a valid invitation or, alternatively, Alice may simply enter the information by pre-selecting options, e.g., via drop-down selection menus.

At step 208, Alice receives from the service provider 104 a redeem script which has been generated by the service provider 104 based on her selections and includes information concerning the entities Alice wishes to exchange and any conditions associated with the invitation. Because Alice has signed up to use the particular service provider 104, the service provider 104 may already have Alice's public key. Alternatively, Alice may provide her public key to the service provider 104 either during the initial selection, or in response to a request from the service provider 104.

Alice signs the redeem script at step 210 using her private key, which is a cryptographic pair to her public key, and at step 212 sends the signed redeem script back to the service provider 104 to be distributed. This process may be supported with the use of an app, which may itself be provided by the service provider 104.

Figure 3:
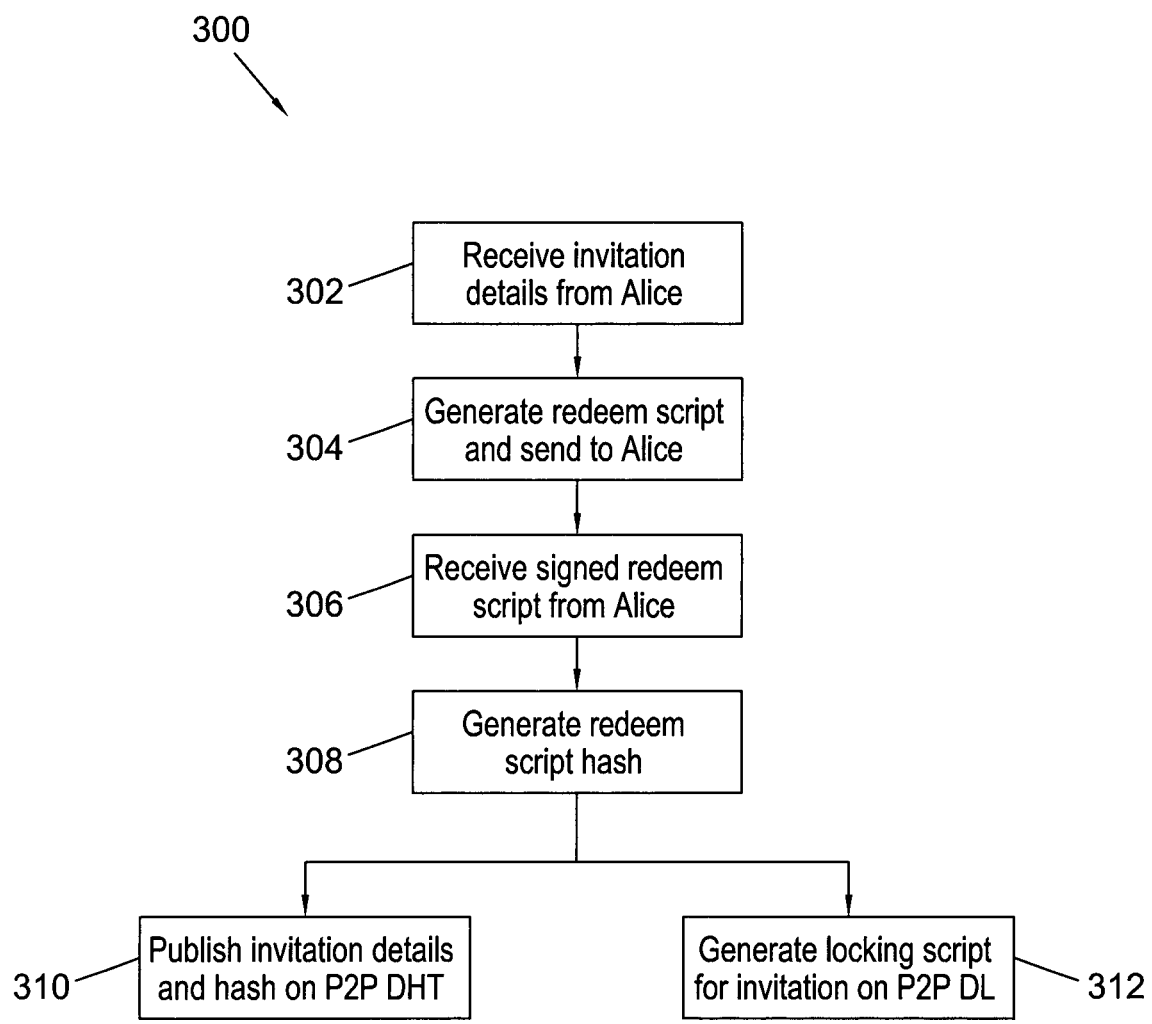
FIG. 3 is a flow diagram illustrating a process performed by an exchange service provider.

The flow diagram 300 shown in FIG. 3 illustrates the corresponding process performed by the service provider 104. At step 302, the service provider 104 receives the invitation details from Alice and generates a redeem script at step 304 using Alice's public key, the entity details and the conditions of the invitation. The redeem script may be in a format suitable for a P2SH bitcoin transaction; the invitation details may be stored in metadata fields in place of 32-byte public keys usually used in multisig unlocking scripts. FIG. 4 illustrates a format of the metadata for Alice's invitation, according to one embodiment. In the invitation, Alice requests tokenised CAD and offers bitcoins in return at a rate of no less than 400 CAD/bitcoin. As will be explained below in more detail, FIG. 4 also shows a deadline condition which may be added to the invitation. The deadline condition may cause the invitation to be revoked at the deadline in the event that an exchange has not been finalised based on the invitation.

The redeem script is then sent to Alice for signing. Upon receipt of a signed redeem script from Alice, at step 308 the service provider 104 generates a hash of the signed redeem script.

The service provider 104 may use the hash in two ways. Firstly, at step 310, the service provider 104 lists the invitation details along with the hash on the publicly available P2P DHT. As mentioned above, this table employs the torrent technique so it is distributed rather than centralised and hence it will remain publicly accessible and safe from alteration. Other service providers 104 are then able to access the invitation and list it on their own site (indeed, the service provider 104 may simply use the hash table as the sole repository and need not even maintain its own local database of invitations.

The second way the hash is used is to create a locking script of a Bitcoin transaction, at step 312. This transaction spends an amount of Alice's bitcoins to a P2SH script requiring 2 signatures to unlock: Alice's signature and that of her nominated escrow service provider 110 (which, as mentioned above, might or might not be the same entity as the service provider 104). The purpose of this transaction is twofold. Firstly, the invitation is logged on the P2P DL. Any user or their service provider can verify that the invitation on the P2P DHT is legitimate by ensuring that there exists a matching transaction on the P2P DL (via the matching hash values). Secondly, the transaction 'locks' the commitment made by Alice in her invitation; the amount of bitcoins Alice is offering in exchange for tokenised CAD is the amount spent by the order transaction. Thus, it can be verified that the order is backed by sufficient funds.

Pairing Matching Invitations

In a second example which refers to the above described first example, Bob wants to sell some of his tokenised CAD for BTC and has independently listed his own invitation either using the same or a different service provider to the service provider 104 used by Alice. Bob's order, too, has been listed on the hash table and embedded in a P2P DL transaction as described with reference to FIGS. 2 and 3. The metadata of Bob's invitation is illustrated in FIG. 5.

Figure 6:
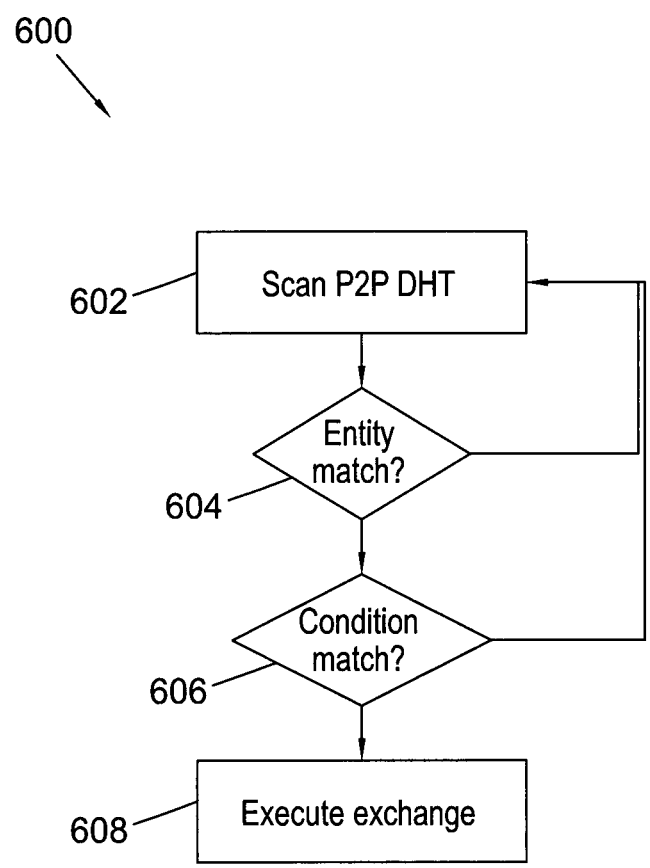
FIG. 6 is a flow diagram illustrating a process of matching invitations from two or more users of the system of FIG. 1.

Referring to FIG. 6, a process 600 of matching Alice's and Bob's orders is described. In this example, the service provider 104 is described as performing the process. However, it will be appreciated that any exchange service provider or, indeed, any other suitable third-party may perform the process 600.

The exchange service provider 104 may run a matching algorithm operable to identify a full or partial match between Alice's and Bob's invitations. At step 602, the exchange service provider 104 scans the P2P DHT for matching entity details. During the scan, the service the provider 104 checks for a match between the entity details of Alice's and Bob's invitations. If a match is not found at step 604, then the process returns to step 602 and the exchange service provider 104 continues to scan the P2P DHT for matching entity details. If a match is found at step 604, the process 600 continues to step 606 where a check is made for a match between one or more of the conditions of each of Alice's and Bob's invitations. If no match is found at step 606, the process returns to step 602. If a match between one or more conditions is found, then the process moves to step 608 in which the exchange service provider 104 attempts to create and finalise a transaction between Alice and Bob.

A direct match of all conditions in the two invitations may not be required at step 606 for a positive match to be confirmed. Indeed, the process 600 may only require that some of the conditions match. Additionally or alternatively, one or more of the conditions need not fully match. For example, if conditions being compared are exchange rates proposed in each condition, the process 600 may confirm a positive match provided the rates are within a predetermined threshold range of each other. For example, if Alice proposes a minimum rate condition of $4 \times 10^{-5}$ tokenised CAD/satoshi and Bob's equivalent minimum proposed rate is $3.9 \times 10^{-5}$ tokenised CAD/satoshi, the process may still confirm a condition match even though Bob's offered rate doesn't quite satisfy Alice's original requirements. In such circumstances, upon match, Alice may be given an option to accept. It will be appreciated that if Bob's equivalent minimum proposed rate is $4.1 \times 10^{-5}$ tokenised CAD/satoshi, then the condition would be satisfied. In another example, the conditions might be respective values for goods and services proposed in an offer and request. The process 600 may again confirm a positive match provided the two values are within a predetermined threshold range of each other. In each case, the predetermined threshold range may be, for example, a discrete value or a percentage of the offer value or request value.

As stated previously, the transaction metadata for each or both of Bob's and Alice's invitations may further comprise one or more location conditions which may specify, for example, that a transaction is only broadcast onto the P2P DL if the location of the transactional broadcast is within X metres of specified coordinates. This ensures that the transaction can only take place at a specified location, for example, Bob's coffee shop.

Once a match is found, and before completing the transaction, one or more intervening steps may be performed. These may include an alert to the parties that a match has been found, followed by a request to each or both parties for confirmation that they wish to proceed, etc. For example, as discussed above, where a condition is nearly but not fully met by one or more users, a match may still be recorded but not finalised until all parties are happy with the conditions of the invitations. This process may lead to counter offers to negotiate a final agreement on conditions, which may then lead to the generation of further invitations in accordance with processes described above.

The final exchange may be executed by creating one or more bitcoin transactions that spend the outputs of each invitation transaction. The inventors have found several methods of completing the transaction, which may depend on circumstances including but not limited to: the users involved in the transaction, the entities being exchanged, and the service providers and issuers involved in the transaction. Some examples of these methods are described below.

Figure 8:
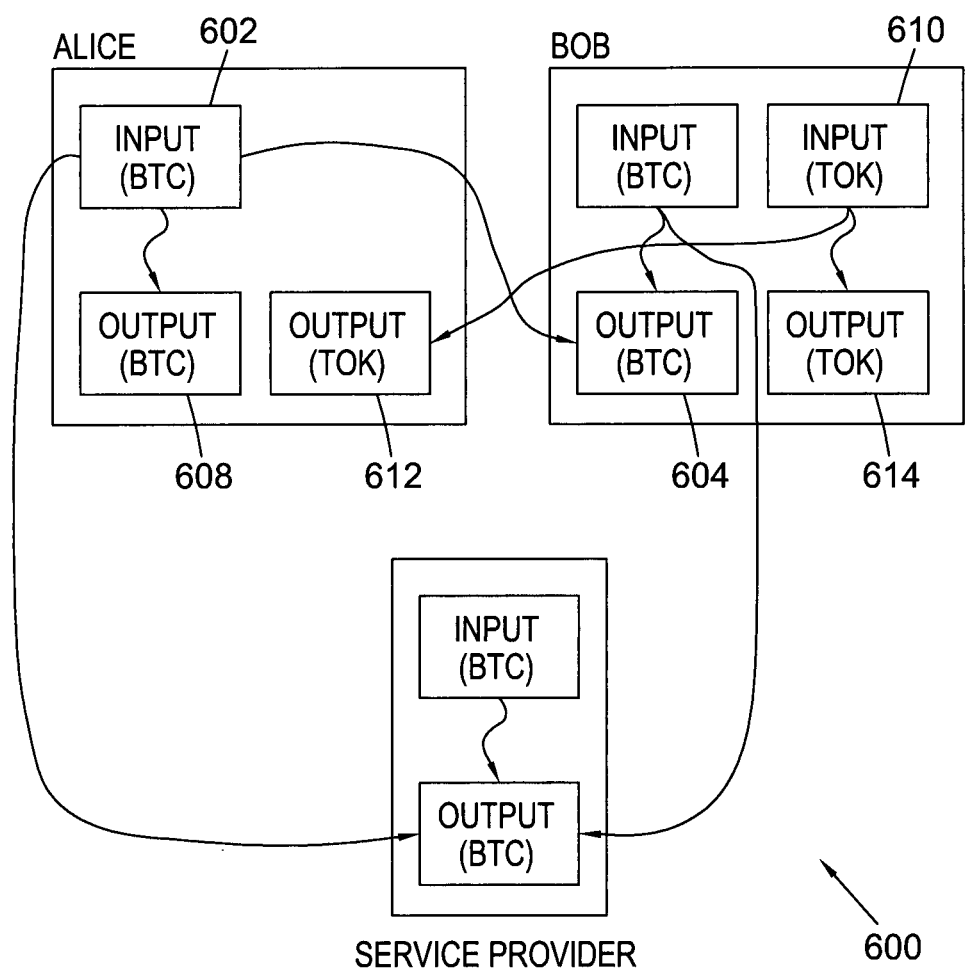
FIG. 8 is a transaction diagram illustrating transactions between parties to the system of FIG. 1.

Following on from the examples described above with reference to FIGS. 2 to 6, a transaction table 500 for the separate transactions for Alice-Bob and Bob-Alice is shown in FIG. 7 and a schematic diagram 600 of the transaction flow is shown in FIG. 8. As with the metadata values shown in FIGS. 4 and 5, values provided in the transaction table 500 are shown. In this example, Alice's bitcoins in her invitation transaction are spent to Bob, and Bob's CAD-tokenised bitcoin in his invitation transaction are spent to Alice.

Referring first to the Alice-Bob transaction, the input 602 of this transaction is provided from the output of the invitation transaction which was placed on the P2P DL with Alice's invitation. Like the first transaction, the input script is signed by both Alice and the escrow service provider 110 (assuming Alice is happy for the transaction to proceed). The script unlocks the spent bitcoins which can then be output to a) Bob as his payment in return for the tokenised CAD (604), b) the exchange service provider 104 as payment for the exchange (606), and c) to Alice as change if any is due (608).

Referring now to the Bob-Alice transaction, this transaction has two inputs. The first input 610 of the transaction is provided from the output of the invitation transaction which was placed on the P2P DL with Bob's invitation. Because the input to this transaction is tokenised, the input script needs to be signed by both Bob and his token issuer. In this circumstance, the token issuer may also operate as an escrow, thereby withholding the funds until Bob (and optionally Alice) are satisfied with the transaction. The signed script unlocks the spent tokens which can then be output to a) Alice as payment in return for the BTC (612), and b) back to Bob as a change token to the value of the original token less the value sent to Alice (614). The second input 616 is from a previous bitcoin transaction of Bob. This input is unlocked and output to a) the service provider 104 as payment for the exchange, b) the bitcoin miner as a fee for the exchange transaction and c) to Bob as change in bitcoins to the value of the original bitcoin input value less the service provider's 104 fee and the miner's fee.

The service provider's 104 fee for each transaction may be a slice of the value of the transaction. Alternatively or additionally, the fee may be a slice of the exchange rate spread between corresponding rate conditions presented in the two invitations. For example, where the offered rates overlap, the service provider 104 may fulfil both sides of the exchange at the asking rate of each and retain the difference as the fee. Alternatively or additionally, a flat fee (in satoshis, tokenised currencies or other) may be taken by the service provider 104.

Once the transaction has been completed, Bob's and Alice's respective service providers may remove their invitation entries from the P2P DHT or enter a further entry which nullifies the original entry. For example, a service provider may simply leave the entry on the P2P DHT since the entry corresponds to a spent transaction, which implies that the invitation is no longer valid. Alternatively, a service provider may mark the transaction with a field that specifies that it has been spent. This may be a separate field on the DHT which corresponds to a particular entry but does not change the actual metadata associated with the invitation (this ensures that the script hash still matches the hash on the transaction). Alternatively, a service provider may delete the entry from the P2P DHT. However, a benefit of the P2P DHT is a permanent audit control for transaction using the system 100. Preferably, therefore, deletion of entries from the P2P DHT is prevented or deleted entries are archived so as to maintain a record of the entry. In one example, deleted entries are archived.

In the above example transaction, no puzzle is exchanged. In other words, the two transactions (Alice-Bob and Bob-Alice) are completely separate and discrete. It may be preferable in some cases, however, for the two transaction either to be valid or invalid. FIG. 9 shows an alternative transaction example in which a puzzle is exchanged in Alice's transaction (Alice-Bob). By doing so, the two transactions are locked together so that one cannot be spent without the other also being spent. This prevents a transaction going through from one party to another without the opposite transaction also going through.

In the above two example two bitcoin transactions are performed to complete the exchange. Where possible, however, it is preferable to consolidate the above two transactions into a single bitcoin transaction. Doing so automatically locks together the two parts of the exchange and leads to a reduction in the overall fees paid by Alice and Bob for the transaction.

FIG. 10 shows a transaction table 700 for the single transaction between Alice and Bob. The transaction flow for the exchange is the same as that of the previous two examples, i.e. as shown in FIG. 6. However, the exchange is consolidated into a single multi-input-multi-output (MIMO) transaction. It is noted that in FIG. 8, two separate fees are paid to the exchange service provider 104. However, if the exchange service provider 104 is the same for both Bob and Alice, these two fees may be consolidated into a single transaction, paid by Bob or Alice, or both Bob and Alice.

Posting an Invitation

In a third example, Bob offers an exchange of a gold nugget for a specific amount of Bitcoins. To publish his offer, Bob contacts a first third party, which in this case represents his exchange service provider 104. In this particular example, the exchange service provider 104 provides a communication interface that is implemented by a software application running on Bob's cell phone. Thus, Bob can enter his offer for the exchange of the gold nugget using the software application on his cell phone as will be described in more detail below with reference to the process 700 shown in FIG. 11.

Figure 11:
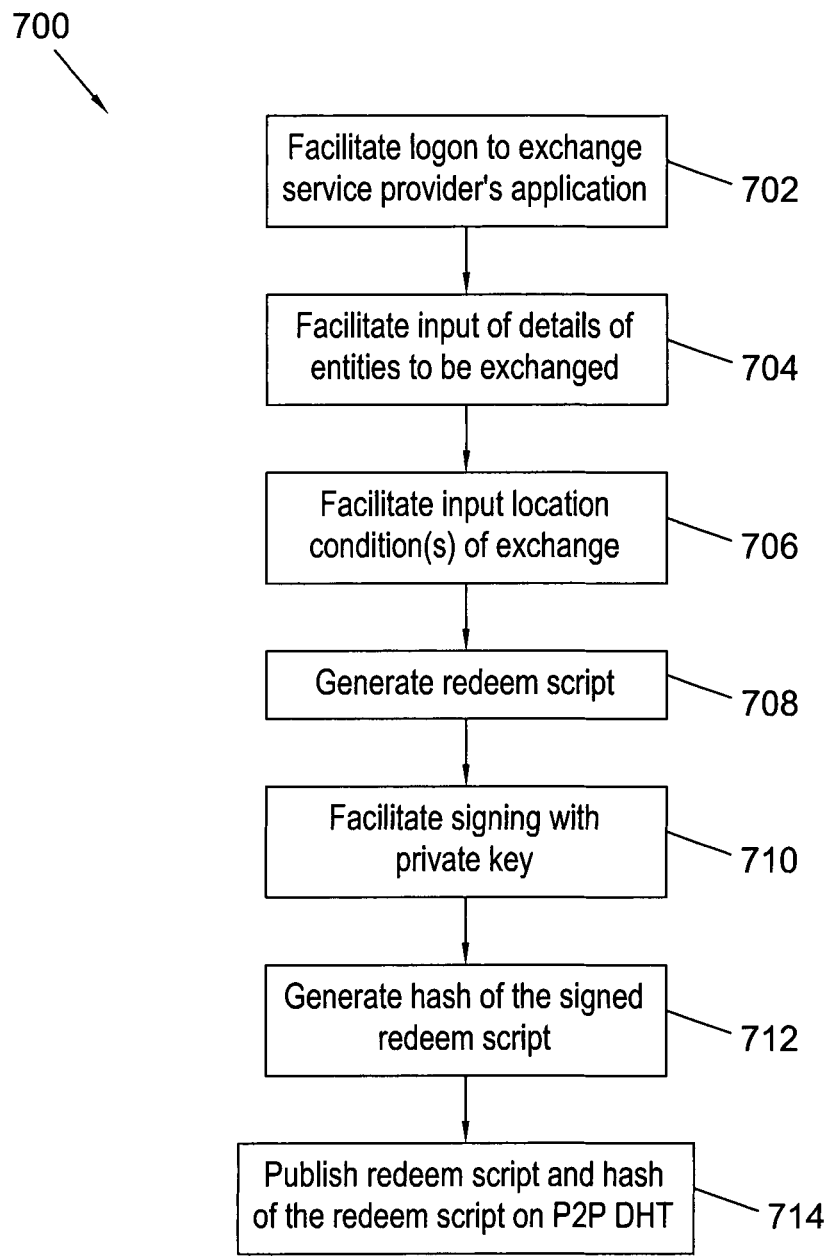
FIG. 11 is a flow diagram illustrating a process performed by an exchange service provider.

As shown in FIG. 11, at step 702, Bob logs onto the exchange service provider's 104 software application on his cell phone and enters at steps 704 and 706 details of his offer into the application. The details of the offer in this particular example include the entity offered for exchange, i.e. the gold nugget, an expected amount of Bitcoins in exchange for the gold nugget, and a location condition.

The location condition may include one or more of the following information:

a) location information indicative of a geographical location or area for the exchange of the gold nugget;

b) location format information indicative of a format of the location information;

c) range information indicative of a range limit on the geographical location or area relating to the exchange; and d) range format information indicative of a format of the range information.

In this particular example, the location condition of Bob's offer specifies an area which is defined as range of 20 metres from Bob's store "the Gold Emporium". The range of 20 metres may be specified to allow for known limits to accuracy of GPS readings by Bob's cell phone in the specified area. However, it will be appreciated that a range may be specified for various reasons. For example, the location condition may specify a country or a city in which the exchange needs to take place.

Bob may input the above mentioned information into an interface hosted by his service provider's 104 software application, for example using normal language which can then be translated by the service provider 104 into a valid offer or, alternatively, Bob may simply enter the information by pre-selecting options, e.g., via drop-down selection menus.

At step 708, a redeem script is generated using Bob's public key and Bob's selections which include information concerning the entities Bob is offering for exchange and any conditions including the above location condition associated with the offer. Bob's public key is part of an asymmetric cryptographic pair which comprises a private key and the public key. In addition, the generated redeem script includes a further public key that is the service provider's 104 public key.

At step 710, the software application facilitates Bob to sign the generated redeem script with his private key which corresponds to the above mentioned public key. The generated redeem script may be in a format suitable for a P2SH bitcoin transaction; the invitation details may be stored in metadata fields in place of 32-byte public keys usually used in multisig unlocking scripts as described above.

At step 712, a hash of the signed redeem script is generated. At step 712, the script along with the hash is published on the publicly available P2P DHT. As mentioned above, this table employs the torrent technique so it is distributed rather than centralised and hence it will remain publicly accessible and safe from alteration. The invitation can be accessed by other users and exchange service providers.

FIG. 12 illustrates a format of the metadata for Bob's script, according to one embodiment. In the invitation of the script, Bob requests Bitcoins in exchange for a gold nugget. As will be explained below in more detail, FIG. 12 also shows the above mentioned location condition which is added to the invitation.

The general format of condition metadata blocks in the P2P Exchange model is shown in FIG. 13. Metadata blocks are 32 bytes long. The first two bytes of a Condition metadata block are a numeric code which defines the condition, as specified via a separate look-up table such as distributed hash table. The format for the remaining 30 bytes of a Condition metadata block will depend on the Condition.

As shown in the example for Bob's script in FIG. 12, the location condition in this particular scenario is allocated the value 0004.

The general format of a location condition code is shown in FIG. 14 in which explanations for the fields are as follows:

| | |
|---|---|
| LocationCode | 2 byte numeric code indicating the format of the Location. A separate look-up table defines the codes and their specification |
| RangeCode | Optional value indicating the units of measurement to specify an acceptable range subcondition. If set to 0x00 then no range subcondition is specified. A separate look-up table defines the codes and their specification |
| Range | Optional value indicating the acceptable range subcondition. This value is irrelevant (ignored) if RangeCode = 0x00 |
| Location | The actual location, specified in the format required by the LocationCode |

As will be appreciated, a location condition can be specified in different formats. Some specific, non-limiting examples are given below:

| LocationCode | Description | Byte Format |
|---|---|---|
| 0x0101 | GPS Co-ordinates | 01-01: 'N'/'S'<br>02-08: degrees (NN) minutes (NN.NNN)<br>09-09: 'E'/'W'<br>10-17: degrees (NN) minutes (NN.NNN) |
| 0x0001 | USA Zip Code | 01-05: NNNNN |
| 0x0061 | Australia Postcode | 01-04: NNNN |
| 0x1044 | UK Building Name and Level | 01-23: first 23 characters of building name<br>24-26: level number (NNN) |

As mentioned above, the location condition may further specify a range from the specified location. The range may allow for known limits to accuracy of GPS readings or may define an area in which the exchange of the entity must take place for the exchange to be finalised. Some examples for the format of the range code is given below:

| RangeCode | Description |
|---|---|
| 0x00 | No Range specified |
| 0x01 | Metres |

-continued

| RangeCode | Description |
| --- | --- |
| 0x02 | Kilometres |
| 0x11 | Within adjoining category [e.g.: if LocationCode = 0x0001 then this would mean 'adjoining USA postcode'; if LocationCode = 0x1044 then this would mean 'next floor above or below'; etc.] |

Matching an Offer

In a fourth example which refers to the above described third example, Alice has seen Bob's offer on the P2P DHT and goes to Bob's Gold Emporium as specified in the location condition of Bob's script to inspect the gold nugget.

On examining the gold nugget and negotiating an amount of Bitcoins in exchange for the gold nugget, Alice creates a matching offer using a software application that is running on her cell phone. In particular, the software application facilitates Alice to enter details of the entities to be exchanged, i.e. one gold nugget in exchange for the negotiated amount of Bitcoins. Using the entered details, a redeem script is generated for Alice which is then hashed and published together with the hash of the redeem script on the P2P DHT. The metadata of Alice's offer is illustrated in FIG. 15.

In this particular example, Bob's script as shown in FIG. 12 does not specify a minimum or maximum rate of Bitcoins for the exchange to be finalised. Thus, when the exchange service provider 104 runs the matching algorithm as described above to identify a match between Bob's and Alice's offers, Bob will be given an option to accept Alice's offer.

In this particular example, the process of matching Alice's and Bob's scripts further includes a step of verifying that the location condition is fulfilled which is specified in Bob's script as shown in FIG. 12. This verification step may be performed in various ways.

For example, the exchange service provider 104 may communicate with Bob's and/or Alice's cell phone to determine the location of the cell phone. This location may then be compared with the location and the range specified in the location condition of Bob's script.

If the location is specified as a building name, such as Bob's Gold Emporium, the exchange service provider 104 may determine GPS coordinates associated with this location by communicating with a proprietary database or a further software application, such as Google maps. The determined GPS coordinates may then be compared with the GPS coordinates of Bob's or Alice's cell phone.

In a further example, the exchange service provider 104 may facilitate manual input by Bob and/or Alice to confirm that the location condition is fulfilled. This step may, for example, be conducted together with the step of accepting Alice's offer.

If the location condition is found to be fulfilled, the exchange service provider 104 will attempt to create and finalise a transaction between Alice and Bob. In one example, a transaction is only broadcast onto the P2P DL if the location of the transactional broadcast is within X metres of specified coordinates. This ensures that the transaction can only take place at a specified location, for example, Bob's Gold Emporium.

The final exchange may be executed by creating one or more bitcoin transactions that spend the outputs of each invitation transaction as described with reference to the first and second examples shown in FIGS. 2 to 10.

Transactions Involving More than Two Parties

Transactions described above have been in relation to exchanges between two parties and two entities. It will, however, be appreciated that in some examples more than two parties and/or entities may be involved in an exchange. Consider, for example, the following scenario. Alice wishes to exchange bitcoins for apples, but will only accept a minimum of 1000 apples. Bob wants to exchange apples for bitcoins, but can only supply 500 apples. Carol wants to exchange apples for bitcoins but can only supply 600 apples. In such a circumstance, the conditions of Alice's invitation cannot be satisfied by Bob or Carol individually. Together, however, Bob and Carol have 1100 apples and so can satisfy Alice's invitation conditions.

In another example, Alice wishes to exchange tokenised CAD for tokenised GBP, Bob wishes to exchange tokenised GBP for tokenised AUD, and Carol wishes to exchange tokenised AUD for tokenised CAD. No direct match exists between any two of the three parties, but combined, each of the invitations can be satisfied—Alice's tokenised CAD can go to Carol, Bob's tokenised GBP can go to Alice, and Carol's tokenised AUD can go to Bob. FIGS. 16A to 16C show exemplary transaction tables for transactions between Alice, Bob and Carol.

Referring first to FIG. 16A, a transaction table is shown for the payment from Alice to Carol. Alice has $1500 of tokenised CAD and needs tokenised GBP500 from Bob. The transaction pays tokenised CAD1000 to Carol from Alice and Alice pays herself the remaining tokenised CAD500 (1500-1000). Using regular BTC, Alice may pay the service provider's fee (which may be a flat fee as is shown in FIG. 11A or a fee dependent on the value of the transfer) and pays herself the change minus 1000 satoshis for the miner.

Referring now to FIG. 16B, a transaction table is shown for the payment of tokenised GBP to Alice from Bob. Bob has tokenised GBP750 and needs tokenised AUD from Carol. The transaction pays tokenised GBP500 to Alice from Bob and Bob pays himself the remaining tokenised GBP250 (750-500). Using regular BTC, Bob may pay the service provider's fee (which may be a flat fee as is shown in FIG. 16B or a fee dependent on the value of the transfer) and pays himself the change minus 1000 satoshis for the miner.

Referring now to FIG. 16C, a transaction table is shown for the payment of tokenised AUD to Carol from Bob. Carol has tokenised AUD1500 and needs tokenised CAD from Alice. The transaction pays tokenised AUD1000 to Bob from Carol and Carol pays herself the remaining tokenised AUD500 (1500-1000). Using regular BTC, Carol may pay the service provider's fee (which may be a flat fee as is shown in FIG. 11C or a fee dependent on the value of the transfer) and pays herself the change minus 1000 satoshis for the miner. It will be appreciated that where an exchange is composed of two or more separate transactions (e.g. 1: Alice transfers to Bob; and 2: Bob transfers to Alice), the transactions may be linked so as to ensure that either every party receives their entitlement or none of them do. This may be achieved by satisfying the following condition (using an example of two parties, A and B, but easily extendable to three or more parties): The transaction output transferring from A to B exists and is spendable by B only if the transaction output transferring from B to A also exists and is spendable by A at the same time, and vice versa. It is noted that party A and party B refer to the required set of signatories for each transaction, not just Alice and Bob (for example, it may include token Issuers, escrow, etc.).

Receiving a Selection from a User

In a variation of the example exchange described above with reference to FIG. 6, instead of a service provider parsing the P2P DHT for matching orders, users themselves may scan or browse the P2P DHT to view the current invitations as described with reference to the above fourth example. Browsing may be facilitated by a third-party, such as the exchange service provider 104. The third-party may provide an interface within which users can browse, scan and search for invitations which they might be interested in.

Users may then skip the process of entering their own prospective invitation on the P2P DHT, but instead choose to create an invitation which matches or nearly matches the order which they're interested in.

For example, Bob may find Alice's invitation on the P2P DHT via a browsing or searching interface. In which case Bob may enter his own invitation to match that of Alice's. Bob may do this in one of several ways. In one example, there may be a facility on the interface which displays Alice's order to 'Accept' her order. If Bob is a client of the same exchange service provider 104 as that which Alice used for the invitation, they may already have access to Bob's eWallet (public key etc.) and can thus create the matching order based on such information. Accordingly, the exchange service provider 110 may generate a redeem script for the matching invitation, send this to Bob for signing, receive the signed redeem script and enter the order onto the P2P DHT in preparation for the transaction. If Bob is not a client of Alice's exchange service provider 104, a facility may be provided to allow Bob to enter the required information and authorisations that can then enable the Service provider to create Bob's matching order. The same process as that described above with reference to FIGS. 7 and 8 may then follow.

The above example describes the exchange of BTC for tokenised CAD. However, it will be appreciated that the system 100 works for any type of exchange including, for example, BTC for token of any type (i.e. representing any contract, not just for currency contracts), token of any type for token of any other type, BTC for goods/services, tokens for goods/services, or goods/services for goods/services. Additionally and theoretically, the above process can be modified to the exchange of BTC for BTC, although such an exchange has no real meaning.

Exchanging Goods/Services

A slight variation of the above described transaction process is required when goods/services are involved in the exchange.

In such a case, the transaction (of the goods and/or services) comprises a description of the goods or services involved in the exchange. Unlike a token, which is represented by a contract or title deed, the description does not form a contract.

The description may or may not uniquely identify the item. For example, where a physical item is involved in the transaction, the description may refer explicitly to a unique identifier associated with that physical item. Additionally or alternatively, description metadata may include one or more of the following: a) a general description of a desired item offered or requested, e.g., "dishwasher, <3 years", b) reference to a specific item for sale on an auction website, e.g., "second hand product put up for sale on an auction site", c) any number of an item type, e.g., advertise 15 t-shirts for sale that can be bought as singles or any quantity up to 15, d) reference to cash, in any specified currency, e) description of labour and payment per single job completion or for regular lawn mowing (repeating job) with payment per repetition or hour, or f) one or more keywords, e.g. "dishwasher".

With regard to services, services may be backed by a contract as with a token. As such, a service may be divisible into shares, and non-divisible services may be considered as one-time jobs, i.e. divisible but comprising a single share (1 share). If the service is non-divisible, it may be treated as a token for the purpose of invitation and exchange. Where an item is backed by a token it is treated as a token for the purpose of both invitation and exchange and is exchanged in the same manner as other tokens, such as tokens for fiat currency.

An example of a transaction involving a physical item associated with a unique identifier will now be described. Similar to previous examples, in the present example, Alice has used her exchange provider to place an invitation on the P2P DL and P2P DHT. The invitation includes a description that she will buy a physical item having unique identifier XYZ123, which may relate to Rafael's masterpiece Deposition of Christ, for no more than 2500 BTC. Equally, Bob may have placed a matching invitation that he will sell item XYZ123 for no less than 2400 BTC. Alice may have browsed the P2P DL and found the item with item number XYZ123 and placed a matching order based on this information or, alternatively, Alice may have placed a generic invitation which is then matched by a third party, e.g., an exchange service provider, and subsequently a new invitation including the catalogue item number and description is made to match Bob's order.

For transactions involving unique IDs, it will be appreciated that such IDs must be unique not only to a particular exchange service provider, but also across the entire P2P DL. Therefore, if the unique identifier is not unique to the device (e.g. the devices serial number) then the exchange service provider may generate a unique identifier for the device. To ensure that each identifier is unique to the entire P2P DL, each exchange service provider may, for example, have their own unique code prefixed to numbers they use to uniquely identify products being advertised on the P2P DL.

Once an agreement has been reached between Alice and Bob, the transactions may take place in accordance with the example transaction processes described above with reference to FIGS. 7 to 10.

A further example of a transaction involving a physical item will now be described. In this example, however, the item does not have a unique identifier associated therewith.

Where an invitation includes an offer to sell a plurality of similar items, metadata may be required to describe the maximum and minimum quantity of items which can be bought with any one transaction. For example, Alice may place an invitation inferring that she will sell up to 15 Dead Lizard 2015 concert tour t-shirts for 0.025 BTC each—at least 5 per transaction. In this case, metadata values may include a minimum rate (0.025 BTC/15 items); a maximum quantity (Offer-QTY-max (15)) and a minimum quantity (Offer-QTY-min (5)). The table below summarises the metadata associated with the invitation.

| Field | Sub-field | Value | Comments |
|---|---|---|---|
| A | ContractType | 0x0000FF01 | Indicates P2P Exchange Order |
|   | ContractPointer |  | IPv6 address of the actual contract file location |
|   | OfferRequestCodes |  | Coded value indicating Offer-type (4 bits) + Request-type (4 bits) |
|   | Conditions | $00000011_2$ | Bitfield - flags indicating the presence of extra conditions in metadata fields |
|   | Rate-min | 0.025 | BTC/15 items |
|   | Rate-max |  |  |
| C | Offer-QTY-max | 15 | Maximum quantity of t-shirts per sale |
|   | Offer-QTY-min | 5 | Minimum quantity of t-shirts per sale |
|   | Request-QTY-max |  |  |
|   | Request-QTY-min |  |  |
| D | Offer-Item-ID | 01245D2SA | Unique ID related to item |
|   | Request-item-ID |  |  |

The actual BTC value on the payment transaction will then be calculated by an exchange service provider. Because this transaction simply represents an invitation to perform an exchange, the actual value of the transaction may be small, e.g. as small as dust (546 satoshis). Alternatively, as described below, the value may be a nominal amount required by a service provider to guarantee an invitation (e.g. so Alice is incentivised not to pull out).

In a further example, goods in the form of hard currency (cash) may be exchanged. For example, Alice may place an invitation to sell bitcoin for Canadian dollars (hard currency instead of tokenised) with a maximum purchase of 150 BTC. The invitation may additionally include a location condition that the exchange must take place at her shop address: 371 Whimsy Avenue, Brentford. After placing a matching invitation, in order to finalise the transaction, Bob may then bring the cash to Alice's shop to hand over in exchange for a payment in bitcoin transaction. The actual digital transaction of bitcoins to Bob and of the digital record of transfer of hard cash to Alice, may then take place once Bob and Alice have met in her shop for the physical transfer.

In the case of a transaction involving goods/services swapped for other goods/service, it will be appreciated that the transaction on the P2P DL exists as a record only and not for exchanging any value between parties (apart from any fees to service providers etc.). Users may use the system and opt to pay the nominal service fee for entry of the transaction onto the P2P DL so that the exchange is permanently recorded.

It is noted that the original invitation transactions act as invitations only and not as value transfer or as records of events. If a goods-for-goods exchange occurs, such that the exchange involves physical items only, the final exchange need not be recorded on the P2P DL, since the P2P DL is not required to complete any transactions in the final exchange. Notwithstanding, if parties to the exchange of physical items wish to record the exchange on the P2P DL, they may each spend their invitation transactions to one another subject to a fee for the miner for doing so. If the parties do not wish to record the final exchange on the P2P DL, they may each spend their invitation transactions back to themselves, or even leave them unspent on the P2P DL.

In the case of an exchange involving BTC for goods, or tokens for goods, at least one transaction is spent on the P2P DL to transfer the value of the BTC or token. In this case, the invitation transaction offering the goods may or may not be spent since the value of the exchange (goods) is not transferred by spending that invitation transaction. However, again, parties may decide to spend the transaction nonetheless, in order to provide a permanent record of the transfer (e.g., a receipt of sale).

The amount spent on the above transactions might not represent the offered amount in some cases, particularly when Alice's offer is not bitcoin or tokens but goods/service. Instead, the Service Provider might require a 'deposit' by Alice of an amount representing the value of the goods, or might only require a nominal amount if Alice is able to 'guarantee' the offer in another way, or (iii) might itself provide the bitcoins on Alice's behalf (she might not have any) and cover this funding cost by whatever means they charge a fee to the client.

In embodiments described above, users' invitations are published on a P2P DHT. In some embodiments, however, a user's invitation (e.g. the script and script hash) may be published on a website, or sent directly to another user.

In some embodiments, a user's invitation may be stored locally by a service provider. For example, the service provider may host a private auction in which only certain users can access the user's invitation details.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The steps, features, integers, compositions and/or compounds disclosed herein or indicated in the specification of this application individually or collectively, and any and all combinations of two or more of said steps or features.

The invention claimed is:

1. A computer implemented method of offering an exchange of an entity, the method comprising:
   generating, by a processor or group of processors, a first script, the first script comprising:
      a first set of metadata associated with a first invitation for the exchange of a first entity by a first user, the first set of metadata comprising an indication of the first entity to be offered for exchange and a first location condition for the exchange; and
      a first user public key (P1A) associated with the first user, wherein the first user public key (P1A) is part of an asymmetric cryptographic pair comprising the first user public key (P1A) and a first user private key (V1A);
   hashing, by the processor or the group of processors, the first script; and
   publishing, by the processor or the group of processors, the first script and the hashed first script on a distributed hash table (DHT).

2. The method of claim 1, wherein the first script further comprises:
a first third-party public key (P1T) associated with a first third-party, wherein the first third-party public key (P1T) is part of an asymmetric cryptographic pair comprising the first third-party public key (P1T) and a first third-party private key (V1T).

3. The method of claim 1, comprising:
generating, by the processor or the group of processors, a first invitation transaction for inclusion on a peer-to-peer (P2P) distributed ledger, the first invitation transaction comprising an indication of a second entity to be transferred in exchange for the first entity, and the hashed first script.

4. The method of claim 1, wherein the P2P distributed ledger is a block chain used for recording transactions involving a cryptocurrency.

5. The method of claim 3, wherein the first entity that is offered for exchange and/or the second entity to be transferred in exchange for the first entity may be one or more of the following:
a) a cryptocurrency;
b) a contract;
c) goods; and
d) services.

6. The method of claim 5, wherein the contract is for one or more of the following:
a) a fiat currency;
b) title deeds;
c) goods; and
d) services.

7. The method of claim 1, wherein the first location condition comprises one or more of the following:
a) location information indicative of a geographical location or area for the exchange of the first entity;
b) location format information indicative of a format of the location information;
c) range information indicative of a range limit on the geographical location or area relating to the exchange; and
d) range format information indicative of a format of the range information.

8. The method of claim 1, comprising:
matching, by the processor or the group of processors, the first invitation of the first script to a second script that is published on the DHT by comparing at least the first entity specified in the first script with a second entity specified in the second script;
wherein the second script comprises a second set of metadata associated with a second invitation for an exchange of a second entity by a second user, the second set of metadata comprising an indication of the second entity to be offered in exchange for the first entity;
a second user public key (P2A) associated with the second user, wherein the second user public key (P2A) is part of an asymmetric cryptographic pair comprising the second user public key (P2A) and a second user private key (V2A); and
a second third-party public key (P2T) associated with a second third-party, wherein the second third-party public key (P2T) is part of an asymmetric cryptographic pair comprising the second third-party public key (P2T) and a second third-party private key (V2T).

9. The method of claim 8 comprising:
determining whether the location condition is fulfilled by identifying a location of the first user and/or the second user.

10. The method of claim 8 wherein the second third-party is the same as a first third-party associated with a first third-party public key of the first script.

11. The method of claim 8, further comprising:
publishing the second script on the DHT, comprising:
generating the second script;
hashing the second script; and
publishing the second script and the hashed second script on the DHT.

12. The method of claim 11, further comprising:
generating a second transaction invitation for inclusion on the P2P distributed ledger, the second invitation transaction comprising an indication of the first entity to be transferred in exchange for the second entity; and
the hashed second script.

13. The method of any one of claim 3, further comprising:
generating a first exchange transaction for inclusion on the P2P distributed ledger, the first exchange transaction comprising:
the first script;
the first user public key (P1A);
a first third-party public key (P1T);
a first input provided from an output of the first invitation transaction; and
a first output indicating a first quantity of a first entity to be transferred to a second user; and
recording the first exchange transaction on the P2P distributed ledger.

14. The method of claim 13, further comprising:
generating a second exchange transaction for inclusion on the P2P distributed ledger, the second exchange transaction comprising:
a second script;
a second user public key (P2A);
a second third-party public key (P2T);
a second input provided from an output of a second invitation transaction; and
a second output indicating a second quantity of a second entity to be transferred to the first user; and
recording the second exchange transaction on the P2P distributed ledger.

15. The method of claim 12, further comprising:
generating a first exchange transaction for inclusion on the P2P distributed ledger, the first exchange transaction comprising:
the first script;
the first user public key (P1A);
a first third-party public key (P1T);
the second script;
the second user public key (P2A);
the second third-party public key (P2T);
a first input provided from an output of a first invitation transaction;
a second input provided from an output of the second invitation transaction;
a first output indicating a first quantity of a first entity to be transferred to the second user; and
a second output indicating a second quantity of a second entity to be transferred to the first user; and
recording the first exchange transaction on the P2P distributed ledger.

16. The method of claim 13, wherein generating the first exchange transaction comprises:
   facilitating signing of the first script with the first user private key (V1A); and
   facilitating signing of the first script with a first third-party private key (V1T).

17. The method of claim 14, wherein generating the second exchange transaction comprises:
   facilitating signing of the second script with the second user private key (V2A); and
   facilitating signing of the second script the second third-party private key (V2T).

18. The method of any one of claim 13, further comprising facilitating one or more of the first and second users to accept the exchange before generating or recording the first and/or second exchange transactions.

19. The method of claim 14, wherein one or more of the first exchange transaction, and the second exchange transaction is a pay-to-script-hash (P2SH) transaction.

20. A computer system for offering an exchange of an entity, the computer system comprising:
   a first processing device; and
   a non-transitory memory including instructions that, as a result of execution by the first processing device, cause the computer system to:
      generate a first script comprising:
         a first set of metadata associated with a first invitation for the exchange of a first entity by a first user, the first set of metadata comprising an indication of the first entity to be offered for exchange and a first location condition for the exchange; and
         a first user public key (P1A) associated with the first user, wherein the first user public key (P1A) is part of an asymmetric cryptographic pair comprising the first user public key (P1A) and a first user private key (V1A);
      generate a hash of the first script; and
      publish the first script and the hash of the first script on a distributed hash table (DHT).

21. The system of claim 20, where the first and/or second set of metadata is be provided in a redeem script.

22. The system of claim 20, where the first and/or second set of metadata is provided in the script at a location which is designated in a blockchain protocol as a location for a cryptographic key.

23. A processor or group of processors operable to perform the method of claim 1.

* * * * *